United States Patent
Guffey

(10) Patent No.: US 11,919,436 B2
(45) Date of Patent: Mar. 5, 2024

(54) MOBILE FITNESS PLAZA

(71) Applicant: Fit Truk LLC, Kansas City, MO (US)

(72) Inventor: Joshua E. Guffey, Kansas City, MO (US)

(73) Assignee: Fit Truk LLC, Kansas City, MO (US)

( * ) Notice: Subject to any disclaimer, the term of this patent is extended or adjusted under 35 U.S.C. 154(b) by 0 days.

(21) Appl. No.: 18/212,089

(22) Filed: Jun. 20, 2023

(65) Prior Publication Data

US 2023/0406191 A1 Dec. 21, 2023

Related U.S. Application Data

(60) Provisional application No. 63/354,188, filed on Jun. 21, 2022.

(51) Int. Cl.
| | | |
|---|---|---|
| *B60P 9/00* | (2006.01) | |
| *A63B 71/00* | (2006.01) | |
| *B60P 3/42* | (2006.01) | |

(52) U.S. Cl.
CPC ............ *B60P 9/00* (2013.01); *A63B 71/0036* (2013.01); *B60P 3/42* (2013.01)

(58) Field of Classification Search
CPC ........... B60P 9/00; B60P 3/42; A63B 71/0036
See application file for complete search history.

(56) References Cited

U.S. PATENT DOCUMENTS

| | | | |
|---|---|---|---|
| 4,431,205 A | 2/1984 | Speicher et al. | |
| 9,862,299 B2* | 1/2018 | Johnson | B60P 3/00 |
| 10,625,111 B2* | 4/2020 | Beaver | A63B 1/00 |
| 11,414,854 B2* | 8/2022 | Jewell | E04B 1/3445 |
| 2016/0059104 A1* | 3/2016 | Monaco | A63B 71/023 |
| | | | 280/30 |
| 2017/0096091 A1 | 4/2017 | Johnson | |
| 2019/0251883 A1 | 8/2019 | Borden | |
| 2020/0130559 A1* | 4/2020 | Calabria | B62D 63/08 |
| 2021/0138332 A1* | 5/2021 | Dalebout | A63B 21/151 |
| 2021/0346776 A1* | 11/2021 | McLain | B60P 3/00 |
| 2022/0362610 A1* | 11/2022 | Alberione | A63B 71/02 |
| 2023/0173971 A1* | 6/2023 | Factor | B60P 3/34 |
| | | | 280/204 |

OTHER PUBLICATIONS

PCT Patent Application PCT/US2023/025728 International Preliminary Report and Written Opinion of the International Searching Authority dated Oct. 19, 2023.

* cited by examiner

*Primary Examiner* — Tony H Winner
*Assistant Examiner* — Marlon A Arce
(74) *Attorney, Agent, or Firm* — Erise IP, P.A.

(57) ABSTRACT

A mobile fitness plaza configured to be coupled to or integrated into a vehicle to provide mobile fitness stations to one or more users. The mobile fitness plaza includes one or more alcove compartments providing a storage space for exercise equipment and one or more awnings configured to be selectively adjusted between a stowed position and a deployed position to provide shelter and protection for equipment stowed therein and users positioned beneath the one or more awnings.

24 Claims, 8 Drawing Sheets

MOBILE FITNESS PLAZA

RELATED APPLICATIONS

This non-provisional patent application claims priority benefit, with regard to all common subject matter, of earlier-filed U.S. Provisional Patent Application No. 63/354,188, filed on Jun. 21, 2022, and entitled "MOBILE FITNESS PLAZA." The identified earlier-filed provisional patent application is hereby incorporated by reference in its entirety into the present application.

FIELD

The present disclosure pertains to mobile fitness plazas incorporated into vehicles and other mobile equipment.

BACKGROUND

Athletes who have a busy schedule may have difficulty finding time to visit a gym for their workouts. Satellite gyms in and around local communities may still present inconveniences associated with travel to and from the gym. These satellite gyms also tend to have a small floor-plan that limits the available equipment and space for working out. Fitness instructors may provide individual or group exercise sessions. These sessions can benefit athletes through personalized instruction, accountability, and a sense of comradery associated with their workouts. Some fitness instructors seek to accommodate the busy schedule of athletes by bringing their services to the athletes' location or to a centralized location that is more convenient for the athletes, such as a community center, a park, or a workplace. While more convenient, these fitness offerings may be limited by the type and quantity of the equipment that can be readily transported from one location to another. Additionally, setup and take-down time may limit the time available for workouts. Accordingly, it would be welcomed to provide the presently disclosed apparatuses, systems, and methods.

SUMMARY

Aspects, features, and advantages of the presently disclosed subject matter are set forth in part in the following description. Further aspects and advantages may be apparent from the description or through practicing the presently disclosed subject matter.

In some aspects, the techniques described herein relate to a mobile fitness plaza integrated onto a vehicle with a cab portion and a rear portion, the mobile fitness plaza including: a frame disposed within the rear portion of the vehicle; a plurality of alcove compartments disposed within the rear portion of the vehicle and supported on the frame, the plurality of alcove compartments configured to store exercise equipment disposed therein; and one or more hinged awnings rotatably secured to a top portion of one or more of the plurality of alcove compartments, wherein the one or more hinged awnings are selectively rotated between a stowed position in which the one or more hinged awnings provide an enclosure for one or more of the plurality of alcove compartments and a deployed position in which the one or more hinged awnings provide shelter to an area below the one or more hinged awnings.

In some aspects, the techniques described herein relate to a mobile fitness plaza, further including: a modified front bumper disposed on a front portion of the vehicle, the modified front bumper including a mounting adapter configured to interface with one or more exercise equipment devices.

In some aspects, the techniques described herein relate to a mobile fitness plaza, further including: a forward-facing television display mounted in the cab portion of the vehicle such that the forward-facing television display is visible to one or more users positioned in front of the vehicle.

In some aspects, the techniques described herein relate to a mobile fitness plaza, further including: a pivotable barbell station including: a barbell sleeve pivotably mounted to the modified front bumper and configured to receive an end of an exercise bar during use; and a latch configured to hold the barbell sleeve in an upright stowed position while the vehicle is in motion.

In some aspects, the techniques described herein relate to a mobile fitness plaza, further including: a rope mount disposed on the modified front bumper, the rope mount including a loop for receiving at least one exercise rope during use.

In some aspects, the techniques described herein relate to a mobile fitness plaza, further including: one or more storage hooks secured to a back wall of at least one of the plurality of alcove compartments.

In some aspects, the techniques described herein relate to a mobile fitness plaza, further including: a vertical dumbbell storage disposed in a respective alcove compartment of the plurality of alcove compartments, the vertical dumbbell storage including: a rigid frame mounted to a back wall of the respective alcove compartment; and a plurality of slots, each of slot of the plurality of slots including a of cutaway portion configured to receive a handle portion of one or more dumbbells such that the one or more dumbbells are suspended in an upright position within the vertical dumbbell storage.

In some aspects, the techniques described herein relate to a mobile fitness plaza configured to be coupled to a vehicle, the mobile fitness plaza including: a frame; a plurality of alcove compartments supported on the frame, the plurality of alcove compartments configured to store exercise equipment disposed therein; and one or more hinged awnings rotatably secured to a top portion of one or more of the plurality of alcove compartments, wherein the one or more hinged awnings are selectively rotated between a stowed position in which the one or more hinged awnings provide an enclosure for one or more of the plurality of alcove compartments and a deployed position in which the one or more hinged awnings provide shelter to an area below the one or more hinged awnings.

In some aspects, the techniques described herein relate to a mobile fitness plaza, wherein the mobile fitness plaza is integrated into a vehicle trailer configured to be pulled by the vehicle.

In some aspects, the techniques described herein relate to a mobile fitness plaza, further including: a vertical dumbbell storage disposed in a respective alcove compartment of the plurality of alcove compartments, the vertical dumbbell storage including: a rigid frame mounted within the respective alcove compartment; and a plurality of slots disposed within the rigid frame, each of slot of the plurality of slots including a of cutaway portion configured to receive a handle portion of one or more dumbbells such that the one or more dumbbells are suspended in an upright position within the vertical dumbbell storage.

In some aspects, the techniques described herein relate to a mobile fitness plaza, further including: a medicine ball storage integrated into a top portion of the vertical dumbbell storage, the medicine ball storage including: a horizontally oriented rod extending a substantial portion of a width of the respective alcove compartment and configured to hold one or more medicine balls in place while the vehicle is in motion.

In some aspects, the techniques described herein relate to a mobile fitness plaza, wherein the rigid frame of the vertical dumbbell storage includes at least one opening for receiving an exercise attachment.

In some aspects, the techniques described herein relate to a mobile fitness plaza, further including: a kettlebell storage rack mounted to a back wall of a respective alcove compartment of the plurality of alcove compartments, the kettlebell storage rack including: a plurality of hooks, wherein each hook of the plurality of hooks is configured to receive a handle portion of a respective kettlebell such that the respective kettlebell is suspended on the kettlebell storage rack while the vehicle is in motion.

In some aspects, the techniques described herein relate to a mobile fitness plaza, wherein the one or more hinged awnings are selectively rotated between the stowed position and the deployed position responsive to a remote user input from a key fob associated with the vehicle.

In some aspects, the techniques described herein relate to a system including: a vehicle including: a front portion including: a cab; and a modified front bumper disposed including a mounting adapter configured to interface with one or more exercise equipment devices; and a rear portion; a mobile fitness plaza integrated onto the vehicle, the mobile fitness plaza including: a frame disposed within the rear portion of the vehicle; and a plurality of alcove compartments disposed within the rear portion of the vehicle and supported on the frame, the plurality of alcove compartments configured to store exercise equipment disposed therein.

In some aspects, the techniques described herein relate to a system, wherein the mobile fitness plaza further includes: a plurality of hinged awnings that are rotatably secured to a top portion of one or more of the plurality of alcove compartments, wherein the plurality of hinged awnings is selectively rotated between a stowed position in which the plurality hinged awnings provide an enclosure for one or more of the plurality of alcove compartments and a deployed position in which the plurality of hinged awnings provides shelter to an area below the plurality of hinged awnings.

In some aspects, the techniques described herein relate to a system, wherein the plurality of hinged awnings includes: a first hinged awning disposed at a first side of the rear portion of the vehicle, wherein the first hinged awning is configured to cover a first portion of the plurality of alcove compartments disposed at the first side of the rear portion of the vehicle; and a second hinged awning disposed at a second side of the rear portion of the vehicle, wherein the second hinged awning is configured to cover a second portion of the plurality of alcove compartments disposed at the second side of the rear portion of the vehicle.

In some aspects, the techniques described herein relate to a system, wherein the plurality of hinged awnings further includes: a third hinged awning disposed at a rear side of the rear portion of the vehicle, wherein the third hinged awning is configured to cover a third portion of the plurality of alcove compartments disposed at the rear side of the rear portion of the vehicle.

In some aspects, the techniques described herein relate to a system, further including: at least one dipping exercise station disposed at a rear portion of the vehicle, the at least one dipping exercise station including: one or more supporting arms pivotably mounted to a back wall of a rear side of the rear portion of the vehicle; a rigid vertical frame portion pivotably secured to the one or more supporting arms, the rigid vertical frame portion including a plurality of horizontal pins secured thereto; one or more dipping handles pivotably secured to the rigid vertical frame portion via two or more of the plurality of horizontal pins; and one or more platforms pivotably secured to the rigid vertical frame portion via two or more of the plurality of horizontal pins.

In some aspects, the techniques described herein relate to a system, wherein the at least one dipping exercise station is configured to be adjusted into a stowed position with the one or more supporting arms, the one or more dipping handles, and the one or more platforms rotated into an upright orientation such that the at least one dipping exercise station is folded into a rear alcove of the plurality of alcove compartments while the vehicle is in motion.

These and other aspects, features, and advantages thereof are further understood with reference to the following description, the accompanying drawing figures, and the appended claims. The foregoing summary is not intended to identify key features or essential features of the claimed subject matter, nor is it intended to limit the scope of the claimed subject matter.

BRIEF DESCRIPTION OF THE DRAWING FIGURES

Embodiments of the present disclosure are described in detail below with reference to the attached drawing figures, wherein:

FIG. 1 schematically depicts a mobile fitness plaza that includes a plurality of fitness stations deployed for use by one or more athletes;

FIG. 2A schematically depicts a side view of the mobile fitness plaza of FIG. 1, with the plurality of fitness stations in a stowed position;

FIGS. 2B and 2C schematically depict a front view and a rear view, respectively, of the mobile fitness plaza of FIG. 1; and FIG. 3 schematically depicts an example floor plan for a mobile fitness plaza.

Figure 1:
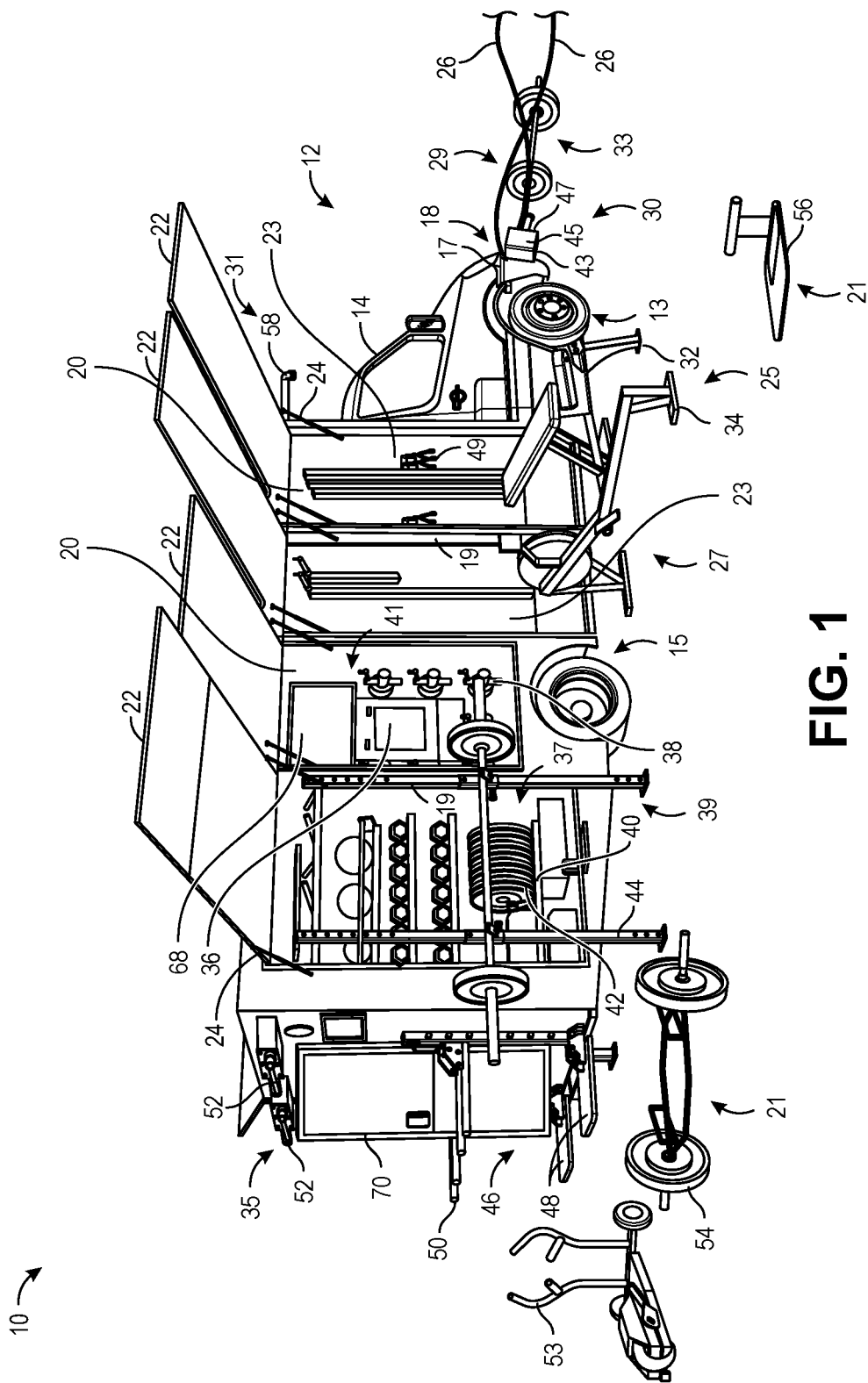

The drawing figures illustrate example embodiments of the presently disclosed subject matter. The claims are not limited to the example embodiments depicted in the drawing figures. The aspects and features depicted in the drawing figures are not necessarily to scale. Repeat use of reference characters in the specification and drawing figures represent the same or analogous aspects or features.

DETAILED DESCRIPTION

The following detailed description references the accompanying drawing figures that illustrate example embodiments of the presently disclosed subject matter. The present disclosure, including the example embodiments depicted in the drawing figures, describe features, aspects, and advantages of the of the disclosed subject matter by way of explanation and not limitation. Various modifications, combinations, and variations can be made to the example embodiments or to aspects or features thereof without departing from the scope of the presently disclosed subject matter. Thus, the present disclosure encompasses such modifications, combinations, and variations. The present disclosure provides sufficient detail to enable those skilled in the art to practice the claimed invention. The present disclosure is, therefore, not to be taken in a limiting sense. The scope of the invention is defined only by the appended claims, along with the full scope of equivalents to which such claims are entitled.

The present disclosure provides mobile fitness plazas. A mobile fitness plaza may include a variety of exercise equipment, including large equipment and machines commonly associated with a full-size gym, incorporated into a vehicle or other mobile equipment. A mobile fitness plaza may be deployed at various convenient locations where athletes may patriciate in workouts, including individual or group sessions, and the like. The presently disclosed mobile fitness plazas include a plurality of fitness stations that respectively have an alcove and an awning. The alcove may be configured to stow one or more items of equipment for transportation and when not in use. The awning may be pivotably couplable from a stowed position to a deployed position. In the stowed position, the awning may provide a closure to the alcove to secure the exercise equipment within the alcove. In the deployed position or an intermediate position, the awning may provide shade, protection form precipitation, protection from wind, and or various other weather. The presently disclosed mobile fitness facilities allow athletes to access various equipment such as barbell racks and other powerlifting equipment, rowing machines, exercise benches, and other large equipment. These and other items of equipment may be pivotably coupled to a wall within a respective alcove and may pivoted from a stowed position within the alcove to a deployed position adjacent to the alcove. The adjacent awning may be deployed to a position that provides protection from various weather conditions during outdoor workouts.

In this description, references to "one embodiment," "an embodiment," or "embodiments" mean that the feature or features being referred to are included in at least one embodiment of the presently disclosed subject matter. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the scope of the presently disclosed subject matter encompasses a variety of combinations and/or integrations of the embodiments described herein.

The terms "a," "an," and "the" do not denote a limitation of quantity but rather denote the presence of at least one of the referenced item. The terms "first," "second," "third," and so forth may be used interchangeably to distinguish one item from another and are not intended to signify location or importance of the respective item. Range limitations in this description and in the claims include all endpoints, and all such endpoints are independently combinable to provide another range limitation.

The term "coupled," when used herein with reference to at least two objects, refers to direct or indirect mechanical or physical contact between two objects in which the two objects are linked, connected, fastened, secured, or joined with one another, including by way of an interference fit, one or more fastening elements or hardware, by welding, or the like. The term "coupled" includes objects that are removably coupled with Referring now to FIG. 1, example embodiments of the present disclosure are further described. As shown in FIG. 1, a mobile fitness plaza 10 may include and/or may be incorporated into a vehicle 12, such as a motor vehicle or a trailer. A vehicle that includes a mobile fitness plaza 10 may sometimes be referred to as a fitness vehicle 12. A fitness vehicle 12 may include one or more axles, such as a forward axle 13 and/or a rear axle 15. As shown, a mobile fitness plaza 10, such as a fitness vehicle 12, may include a plurality of fitness stations 20. The plurality of fitness stations 20 may be associated with one or more items of equipment 21, such as exercise equipment, fitness equipment, auxiliary equipment, or materials or supplies associated with such equipment or an exercise or a workout routine, as well as combinations of these. In some embodiments, a one or more of the fitness stations 20 may include an alcove 23 within which equipment 21 associated with the fitness station 20 may be stowed. Additionally, or in the alternative, one or more of the fitness stations 20 may include an awning 22. The awning 22 may have a rigid structure. The awning 22 may be pivotably couplable to the mobile fitness plaza 10, such as at an upward portion of the fitness plaza 10. The awning 22 may be pivotable from a stowed position to a deployed position, and/or to an intermediate position therebetween. In the stowed position, the awning 22 may provide a closure to the alcove 23 of a corresponding fitness station 20, such as to secure one or more items of equipment 21 within the alcove 23. In the deployed position, the awning 22 may provide weather protection to an athlete while utilizing a fitness station and/or to equipment 21 associated with the fitness station. For example, the awning 22 may provide shade and/or protection from precipitation and/or wind. By way of example, some exercises cause an athlete to look skyward, and the awning 22 may make such exercises more comfortable during various weather conditions. As another example, equipment may have a prolonged lifespan when protected from various weather conditions beneath the awning 22.

The awnings 22 may respectively include one or more latches configured to secure the respective awning 22 in a stowed position, for example, when traveling or when the mobile fitness plaza 10 and/or equipment 21 associated with a respective fitness station 20 is not in use, for example. In the stowed position, the awnings 22 may securely stow equipment 21 stowed within the corresponding alcove 23. The one or more latches may be located at a bottom portion of the awnings 22, coinciding, for example, to a bottom portion of a corresponding alcove 23. In some embodiments, an awning 22 may be supported by one or more support elements 24, such as one or more support arms, poles, linkages, hangers, or the like. As shown, the one or more support elements may include one or more telescopic gas springs. The one or more support elements may provide manual, automatic, and/or aided opening, closing, and/or positioning of the awnings 22, such as from a stowed position to a deployed position and/or to an intermediate position therebetween. Additionally, or in the alternative, the awnings 22 may be spring loaded or rely on a variety of other suitable opening, closing, and/or positioning mechanisms.

The awnings 22 may be secured to a top portion of the fitness plaza 10 by one or more hinges and/or other hardware. The awnings 22 may be pivotable about the one or more hinges, for example, to translate the respective awning 22 from the stowed position to the deployed position, and/or to selectively adjust a position of the awning. The awnings 22 may be pivotable about a hinge at a top portion of the fitness stations 20 such that an angle of the awnings 22 may be selectably adjusted to different angles and/or positions, for example, to coincide with incoming weather, such as a direction of rays of the sun, wind, or precipitation. In some embodiments, the awnings 22 may be extendable, for example, by way of a telescoping or foldable flap, as shown in FIG. 1. For example, in some embodiments, the awning 22 may include a telescoping section which may be extended, while in a deployed position, to provide additional shelter from various weather conditions. Additionally, or in the alternative, the awning 22 may be configured to receive a tarp or curtain, for example, at an end of the awning 22 and/or at one or more sides of the awning 22, to provide further protection from various weather conditions.

Referring still to FIG. 1, a mobile fitness plaza 10 may include a frame 11, supported by one or more axles, and a plurality of walls 19 supported by the frame 11. The mobile fitness plaza 10 may include a plurality of adjacently disposed fitness stations supported by the frame 11 and/or by one or more of the walls 19. At least some of the fitness stations 20 may be integrated with and/or defined by at least a portion of the frame 11 and/or by at least a portion of one or more walls 19 of the mobile fitness plaza 10. In some embodiments, the mobile fitness plaza 10 may include a plurality of fitness stations that respectively include an alcove 23 and a corresponding awning 22. The mobile fitness plaza 10 may include further fitness stations 20 that do not have an alcove 23 and/or that do not have an awning 22, such as a fitness station that has an awning without an alcove 23, and or an alcove without an awning 22. The plurality of fitness stations 20 may be selected, for example, based at least in part on the nature of exercises, workout sessions, and/or other physical activities intended to be performed in association with the mobile fitness plaza 10. For example, a mobile fitness plaza 10 may include one or more fitness stations 20 that include equipment 21 configured for weightlifting (e.g., free weights, machines, etc.), strength training, power lifting, aerobics, cardio, bootcamps, high-intensity interval training, endurance training, boxing, kickboxing, cycling (e.g., spinning, etc.), rowing, running, gymnastics, dance, sports-specific workouts (e.g., team sports and/or individual sports), Pilates, Barre, physical therapy, massage, stretching, and so forth.

For example, as shown in FIG. 1, the plurality of fitness stations 20 may include a powerlifting station 39. Additionally, or in the alternative, the plurality of fitness stations 20 may include a rowing station 27. Additionally, or in the alternative, the plurality of fitness stations 20 may include a bench station 25. Additionally, or in the alternative, the plurality of fitness stations 20 may include a suspension station 31. Additionally, or in the alternative, the plurality of fitness stations 20 may include a rope station 29. Additionally, or in the alternative, the plurality of fitness stations 20 may include a pivotable barbell station 33. Additionally, or in the alternative, the plurality of fitness stations 20 may include a pull-up station 35. Additionally, or in the alternative, the plurality of fitness stations 20 may include a dipping station 46. Additionally, or in the alternative, the plurality of fitness stations 20 may include a free-weights station 37. Additionally, or in the alternative, the plurality of fitness stations 20 may include a resting station 41.

The plurality of fitness stations 20 may be oriented about any one or more sides of the mobile fitness plaza 10. As shown in FIG. 1, a mobile fitness plaza 10 may include a plurality of fitness stations 20 disposed about a longitudinal side, such as a starboard side and/or a port side, of the mobile fitness plaza 10. Additionally, or in the alternative, the mobile fitness plaza 10 may include one or more fitness station 20 disposed about a lateral side, such as a forward side and/or an aft side. In some embodiments, an identical set of fitness stations 20 may be disposed on an opposite side of the mobile fitness plaza 10. Additionally, or in the alternative, the mobile fitness plaza may include one or more fitness stations 20 that differ from one another with respect to opposite sides of the mobile fitness plaza 10. For example, opposite sides of the mobile fitness plaza 10 may include different equipment 21, such as equipment for different exercises, equipment 21 that has different sizes, and/or equipment 21 for different skill levels. A plurality of athletes may progress through a circuit that includes all or a portion of the fitness stations 20. In some embodiments, a similar or identical arrangement of fitness stations 20 may allow a first one or more athletes and a second one or more athletes to progress through a corresponding plurality of fitness stations 20, such as in a competitive or time-based format.

As shown in FIG. 1, a fitness station 20 may include one or more items of equipment 21 that articulate from a stowed position within an alcove 23 to a deployed position adjacent to the alcove 23. The one or more items of equipment 21 may be coupled to one or more walls of the alcove 23, such as a back wall and/or a lateral wall of the alcove 23. The awning 22 corresponding to the alcove 23 may provide at least partial coverage from various weather at a location adjacent to the alcove 23. For example, at least a portion of the equipment 21 may be disposed beneath the awning 22 when the equipment 21 and the awning 22 are in the deployed position.

In some embodiments, as shown in FIG. 1, a fitness station 20 may include one or more items of equipment 21 associated with a powerlifting station 39 that articulate from a stowed position within an alcove 23 to a deployed position adjacently outside of the alcove 23. For example, as shown, a barbell rack 44 may be pivotably coupled to one or more walls of the alcove 23. The barbell rack 44 may be articulated to a deployed position by one or more pivoting deployment arms. The deployment arms may be coupled to one or more sides of the barbell rack 44. The barbell rack 44 may be deployed and/or stowed by articulating the deployment arms, thereby pivoting the barbell rack 44 to the respective deployed or stowed position. The deployment arms may allow the barbell rack 44 to fit within the alcove 23 such that the awning 22 may secure the barbell rack 44 therein when in the stowed position. The deployment arms may allow the barbell rack 44 to rest upon the ground adjacent to the alcove 23 when in the deployed position. In some embodiments, the barbell rack 44 may be foldable at one or more locations for storage within the alcove 23. The alcove 23 may include a latch configured to secure the barbell rack 44 within the alcove 23. The alcove 23 may include one or more support structures, such as the one or more deployment arms and/or the latch, that support the weight of the barbell rack 44. The barbell rack 44 may be configured and arranged for supporting a barbell, such as an Olympic size barbell, bearing barbell plates that have an aggregate weight of several hundred pounds, including, for example, in positions commonly associated with a barbell position used for squats, bench press, deadlifts, cleans, jerks, lunges, and/or other power lifting exercises.

The barbell rack 44 may have a standard width. For example, the barbell rack 44 may have a width of from about 24 to 54 inches, such as from about 42 to 54 inches. The barbell rack 44 may have a fixed width or an adjustable width. The barbell rack 44 may have a height of from about 60 to 100 inches, such as from about 80 to 100 inches. The barbell rack 44 may have a fixed height or an adjustable height. Additional dimensions are also contemplated. In some embodiments, the barbell rack 44 may include a pull-up bar integrated into the top of the barbell rack 44, as shown. In some embodiments, the fitness station 20 may include a foldable step, for example, that folds out from within an alcove 23 to a location adjacent to the alcove 23. The foldable step may provide access to the pull-up bar.

In some embodiments, as shown in FIG. 1, the powerlifting station 39 may be located at a rearward position of the mobile fitness plaza 10, such as at a position located rearward of a rear axle 15 of the mobile fitness plaza 10. In some embodiments, a mobile fitness plaza 10 that includes a fitness station 20 with an alcove 23 configured to stow a barbell rack 44 may include a rear overhang rearward from the rear axle 15 of from 48 to 90 inches, such as from 60 to 90 inches. The rear overhang may be configured and arranged to accommodate the width of the powerlifting station 39, such as to accommodate an alcove 23 configured to stow a barbell rack 44 therein.

The awning 22 may be configured and arranged to provide protection to the barbell rack 44 when in a deployed position and/or to a barbell and/or barbell plates when situated on the barbell rack 44. Protection of the barbell and/or barbell plates from various weather conditions may provide a safety measure for the powerlifting station 39. For example, the awning 22 may provide protection from the barbell plates and/or the barbell becoming wet with precipitation. Additionally, or in the alternative, the awning 22 may provide protection from the barbell plates and/or the barbell becoming excessively hot from exposure to solar rays. In some embodiments, the location of the powerlifting station 39 provides a degree of separation from other fitness stations 20 sufficient to allow an athlete to perform exercises associated with the powerlifting station 39 at a safe distance from other athletes who may be performing exercises at an adjacent fitness station 20.

As shown in FIG. 1, a resting station 41 may be located adjacent to the powerlifting station 39. The resting station may provide further separation between adjacent fitness stations 20 that include exercise equipment 21, such as between the powerlifting station 39 and the rowing station 27. The resting station 41 may include a beverage dispenser 36. The beverage dispenser 36 may dispense water, ice, sports drinks, and/or other beverages. The beverage dispenser 36 may include a cooler, a refrigeration system, a freezer, an ice maker, or the like. In some embodiments, a beverage dispenser 36 may be included at one or more fitness stations 20 in addition or in the alternative to the resting station 41. Additionally, or in the alternative, the resting station 41 may include a video display screen 68. Additionally, or in the alternative, the resting station 41 may include one or more storage racks 40.

Referring still to FIG. 1, in some embodiments, a fitness station 20 may include one or more items of equipment 21 associated with a rowing station 27 that articulate from a stowed position within an alcove 23 to a deployed position adjacently outside of the alcove 23. In some embodiments, a rowing machine 34 may be removably placed within an alcove 23. For example, as shown, a rowing machine 34 may be pivotably coupled to one or more walls of the alcove 23. The rowing machine 34 may be articulated to a deployed position by one or more pivoting deployment arms. The one or more deployment arms may be coupled to a forward portion of the rowing machine 34. In a stowed position, the rowing machine 34 may be oriented within the alcove 23 with the forward portion of the rowing machine 34 facing downward and a rearward portion of the rowing machine 34 facing upward. In some embodiments, the rowing machine 34 may be pivoted forward or aft when in the stowed position. The deployment arms may allow the rowing machine 34 to fit within the alcove 23 such that the awning 22 may secure the rowing machine 34 therein when in the stowed position. The deployment arms may allow the rowing machine 34 to rest upon the ground adjacent to the alcove 23 when in the deployed position. In the deployed position, a forward portion of the rowing machine 34 may be oriented towards the alcove 23. For example, the rowing machine 34 may be oriented perpendicular to the alcove 23 or obliquely facing the alcove 23 when in a deployed position. When using the rowing machine 34, an athlete may face the alcove 23, providing space for the athlete to lean back when performing a rowing motion. A video display screen 68 may be located in the alcove 23 of the rowing station 27. In some embodiments, the rowing machine 34 may be foldable at one or more locations for storage within the alcove 23. The alcove 23 may include a latch configured to secure the rowing machine 34 within the alcove 23. The alcove 23 may include one or more support structures, such as the one or more deployment arms and/or the latch, that support the weight of the rowing machine 34. By way of example, the rowing machine 34 may be a rowing ergometer, such as a Concept2® rowing ergometer.

As further shown in FIG. 1, in some embodiments, a fitness station 20 may include one or more items of equipment 21 associated with a bench station 25 that articulate from a stowed position within an alcove 23 to a deployed position adjacently outside of the alcove 23. For example, as shown, an exercise bench 32 may be pivotably coupled to one or more walls of the alcove 23. The exercise bench 32 may be articulated to a deployed position by one or more pivoting deployment arms. The one or more deployment arms may be coupled to a rearward portion of the exercise bench 32. In a stowed position, the exercise bench 32 may be oriented within the alcove 23 with the rearward portion of the exercise bench 32 facing downward and a forward portion of the exercise bench 32 facing upward. In some embodiments, the exercise bench 32 may be pivoted forward or aft when in the stowed position. The deployment arms may allow the exercise bench 32 to fit within the alcove 23 such that the awning 22 may secure the exercise bench 32 therein when in the stowed position. The deployment arms may allow the exercise bench 32 to rest upon the ground adjacent to the alcove 23 when in the deployed position. In the deployed position, a rearward portion of the exercise bench 32 may be oriented towards the alcove 23. For example, the exercise bench 32 may be oriented perpendicular to the alcove 23 or obliquely facing the alcove 23 when in a deployed position. When using the exercise bench 32, an athlete may face away from the alcove 23 or towards the alcove, for example, depending on the particular exercise being performed. In some embodiments, the exercise bench 32 may be foldable at one or more locations for storage within the alcove 23. The alcove 23 may include a latch configured to secure the exercise bench 32 within the alcove 23. The alcove 23 may include one or more support structures, such as the one or more deployment arms and/or the latch, that support the weight of the exercise bench 32.

In some embodiments, the bench station 25 may include one or more cable towers 49 coupled to a wall within the alcove 23, such as to a back wall and/or to a side wall of the alcove 23. The cable towers 49 may be situated in a position within the alcove 23 that allow the exercise bench 32 to be stowed within the alcove 23, for example, between adjacently disposed cable towers 49. The one or more cable towers may include associated resistance weights and/or other resistance mechanisms, pulleys, handle attachments, and the like configured to allow pushing and/or pulling motions from the exercise bench 32, including upward, downward, lateral, and/or transverse pushing and/or pulling motions.

Referring further to FIG. 1, In some embodiments, a mobile fitness plaza 10 may include one or more fitness bumpers 18. The fitness bumper 18 may include a bumper portion 17 configured to absorb and/or deflect a minor impact, such as may arise from time-to-time when transporting the mobile fitness plaza 10. One or more fitness station 20 may be integrated into a fitness bumper 18 and/or a fitness bumper 18 may respectively include and/or define one or more fitness stations 20. A fitness bumper 18 may be located at a forward portion and/or at an aft portion of a mobile fitness plaza 10. For example, as shown in FIG. 1, a fitness bumper 18 may be provides as a front bumper to a fitness vehicle 12. Additionally, or in the alternative, a fitness bumper 18 may be provided as a rear bumper to a fitness vehicle 12. The fitness bumper 18 may be configured to stow and/or support one or more items of equipment 21 associated with a fitness station 20.

As shown in FIG. 1, in some embodiments, a fitness bumper 18 may include a rope station 29. The rope station 29 may include one or more rope mounts 30 coupled to the bumper portion 17. In some embodiments, as shown, the rope station 29 may include a rope compartment 43 configured to stow the one or more exercise ropes 26. The rope compartment 43 may be defined at least in part by the bumper portion 17. For example, the rope compartment 43 may be disposed within an internal region of the bumper portion 17 defined by one or more walls of the bumper portion 17. The one or more exercise ropes 26 may be secured within the rope compartment 45 by door 47 and/or by a rope mount 30 located within the rope compartment 45. The door may pivot or slide open, such as in a lateral direction, an upward direction, or a downward direction. Additionally, or in the alternative, a rope mount 30 may be disposed about the fitness bumper 18 at a location external to the rope compartment 45. The rope mount 30 may be coupled to the fitness bumper 18. The rope mount 30 may be configured to couple one or more exercise ropes 26 thereto. For example, the rope mount 30 may include an anchor point to which the one or more exercise ropes 26 may be coupled. In some embodiments, the rope mount 30 may be configured to hold an exercise rope 26 in a coiled position.

As further shown in FIG. 1, in addition or in the alternative to a rope station 29, a fitness bumper 18 may include a pivotable barbell station 33. The pivotable barbell station 33 may include a barbell-receiving apparatus coupled to the bumper portion 17 of the fitness bumper 18. The barbell receiving apparatus may include an apparatus commonly referred to as a "landmine" or a "t-bar." One or more barbell receiving apparatuses may be included at a respective pivotable barbell station 33. The barbell receiving apparatus may include a cylindrical tube pivotably coupled to a bracket. The bracket may couple the barbell receiving apparatus to the bumper portion 17. The cylindrical tube may be configured to receive an endward portion, such as a sleeve portion, of a barbell. The cylindrical tube may have a diameter of about 2 inches, for example, coinciding with a diameter of an Olympic size barbell sleeve. The cylindrical tube may be pivotably coupled to the bracket with one or more degrees of freedom. The pivotable barbell station 33 may include a latch configured to secure the cylindrical tube to the fitness bumper 18 when in a stowed position. The barbell receiving apparatus may allow an athlete to perform various exercises, including rows, squats, presses, lunges, and the like. In some embodiments, a pivotable barbell station 33 may include two adjacent barbell receiving apparatuses configured and arranged for an athlete to perform bilateral exercises such as two-handed rows, two-handed presses, or the like.

Referring further to FIG. 1, in some embodiments, a fitness station 20 may include one or more items of equipment 21 associated with a suspension station 31. The one or more items of equipment 21 associate with a suspension station 31 may include one or more cantilever arms 58. The one or more cantilever arms 58 may be coupled to a side of the mobile fitness plaza 10. As shown in FIG. 1, a cantilever arm 58 may be coupled to a forward portion of the mobile fitness plaza 10, such as at a forward corner of the mobile fitness plaza 10. Additionally, or alternative, one or more cantilever arms 58 may be coupled to an aft portion of the mobile fitness plaza 10, such as at an aft corner, and/or to a forward wall, an aft wall, or a lateral wall of the mobile fitness plaza 10. In some embodiments, the suspension station 31 may be utilized with one or more items of equipment 21 that hang from a respective cantilever arm 58. The cantilever arm 58 may be configured and arranged to receive the respective one or more items of equipment 21, such as in a suspended or hanging position. For example, a cantilever arm 58 may be used to coupled one or more punching bags, such as a punching bag commonly referred to as a "heavy bag" and/or a punching bag commonly referred to as a "speed bag." Additionally, or in the alternative, a cantilever arm 58 may be used to support one or more suspension training straps or bands, such as TRX® straps or the like. The mobile fitness plaza may include a step to provide accessing to the cantilever arm 58, such as when attaching or removing equipment 21 from the cantilever arm 58. The cantilever arm 58 may have a suitable length to extend the suspended or hanging exercise equipment 21 away from the mobile fitness plaza 10, for example, to allow sufficient room for the equipment 21 to move or sway during use. A cantilever arm 58 may also be configured for use with any of a variety of other equipment 21 not explicitly described herein.

Referring further to FIG. 1, in some embodiments, a fitness station 20 may include one or more items of equipment 21 associated with a pull-up station 35 and/or a dipping station 46. In some embodiments, a pull-up station 35 and/or a dipping station 46 may be incorporated into a common fitness station 20. As shown in FIG. 1, a fitness station 20 may be configured and arranged about an aft portion of a mobile fitness plaza 10. For example, as shown, the aft portion of the mobile fitness plaza 10 may include adjacently disposed fitness stations 20 that respectively include a pull-up station 35 and a dipping station 46. A door 70 that provides access to an interior region 72 of the mobile fitness plaza 10 may be disposed between the respective fitness stations. The pull-up station 35 may include one or more pull-up bars 52 coupled to a wall of the mobile fitness plaza 10, such as an aft wall as shown. In some embodiments, one or more pull-up bars 52 may be disposed about other portions of the mobile fitness plaza 10. The dipping station 46 may include one or more platforms 48 and one or more dipping handles 50.

In addition to the foregoing, a mobile fitness plaza 10 may include a variety of other exercise equipment 21 coupled to one or more walls of the mobile fitness plaza and/or within one or more alcoves 23. Additionally, or in the alterative, various items of equipment 21 may be stored within an interior region 72 of the mobile fitness plaza 10. Such other exercise equipment may be associated with any one or more of the plurality of fitness stations 20. In some embodiments, an exercise sled 53 may be removably stowed within an alcove 23, such as an alcove 23 associated with a power lifting station 39. For example, the exercise sled 53 may be removably coupled to a back wall of the alcove 23 such that the exercise sled 53 fits between adjacent towers of the barbell rack 44. Additionally, or in the alternative, one or more barbells may be coupled to a wall of the alcove 23, such as the alcove that includes the barbell rack 44. Additionally, or in the alternative, a hexagonal exercise bar 54 may be coupled to a wall of the alcove 23, such as the alcove that includes the barbell rack 44. In some embodiments, a plurality of exercise bands may be disposed within an alcove 23, for example, on a plurality of hooks or other storage elements. In some embodiments, any of the exercise equipment may be removed from an alcove 23 for use at the fitness stations 20. For example, either or both of the exercise bench 32 or the rowing machine 34 may be removably stored within the fitness stations 20 such that they may be fully removed during use. In some embodiments, the mobile fitness plaza 10 may include a floor exercise bar 56, which, for example, may be stored within an alcove 23 or an interior region 72 of the fitness vehicle 12. In some embodiments, a mobile fitness plaza 10 may include a medicine ball wall. For example, the medicine ball wall may include a portion of the aft wall, such as a portion of the door 70.

In some embodiments, one or more storage hooks 38 may be disposed within an alcove 23 associated with at least one of the fitness stations 20. For example, exercise bands may be secured by the storage hooks 38, as shown. In some embodiments, a storage rack 40 may be coupled within at least one of the alcoves 23. The storage rack 40 may be configured to stow a plurality of weights 42 or other equipment 21, such as dumbbells, barbell plates, kettlebells, medicine balls, exercise mats, barbells, or other equipment 21.

In some embodiments, a mobile fitness plaza 10 may include a powerlifting station 39 that includes one or more features configured and arranged as shown in FIG. 1. As shown, in some embodiments, the powerlifting station 39 may include a barbell rack 44. The barbell rack 44 may fold into an alcove 23 via a plurality of arms, such as four (4) arms. The arms may be respectively attached to one or more uprights of the barbell rack 44. The outer portion of the arm may attach to the barbell rack upright via one or more plates that include a pin that allows for pivotable rotation. The arms may pivot under assistance provided by a shock, a gas spring, a strut, or the like. The arms may be attached to a storage system that may hold exercise equipment 21, such as dumbbells, medicine balls, bumper plates, and so forth.

Additionally, or in the alternative, a mobile fitness plaza 10 may include a rowing station 27 that includes one or more features configured and arranged as shown in FIG. 1. As shown, the rowing station 27 may include a rowing machine 34. The rowing machine may be attached to a frame that has an "H-shaped" configuration. The frame may be formed of 2-inch square tubing. A pin/pivot point may be attached to a lower portion of the rowing machine 34, for example, under the fan portion of the rowing machine 35. The pin/pivot may allow the rowing machine 34 to pivot to a stowed position within the alcove 23. The pivoting of the rowing machine may have a range of motion of about 90 degrees, such as from about 75 degrees to about 115 degrees. The "H-shaped" frame may be coupled to a base of the alcove 23. A locking mechanism may be located adjacent to the "H-shaped" frame, such as to the left side thereof. The locking mechanism may hold the rowing machine 35 in an upright position, such as when stowed. The seat portion of the rowing machine 35 may stow adjacent to the fan portion of the rowing machine 35, such as in a in tray attached to a rear wall of the alcove 23.

Additionally, or in the alternative, a mobile fitness plaza 10 may include a bench station 39 that includes one or more features configured and arranged as shown in FIG. 1. As shown, the bench station 39 may include an exercise bench 32. The exercise bench 32 may include a hinging mechanism. The hinging mechanism may be formed of 2-inch square tubing. The hinging mechanism may be about 24-inches long. The hinging mechanism may insert into a receiver attached to the exercise bench 32. A pin may be inserted thought the receiver to secure the exercise bench t32 o the hinging mechanism. The tubing may be attached to a bracket on the floor of the alcove 23. The bracket may include a pivot point allowing the exercise bench 32 to pivotably rotate to a slowed position. The pivoting of the exercise bench 32 may have a range of motion of about 90 degrees, such as from about 75 degrees to about 115 degrees.

The exercise bench 32 may include a square tubing receiver attached to a front lower portion of the bench via a flat metal plate, which may be bolted to the exercise bench 32. The plate may include one or more wheels, such as two wheels, on an outer portion, allowing the exercise bench 32 to be moved to a desired position, such as forward and back. The square tubing receiver and the square tubing received therein, may include a plurality of holes configured to receive a pin that secures the assembly to the alcove 23.

Additionally, or in the alternative, a mobile fitness plaza 10 may include a fitness bumper 18 that includes one or more features configured and arranged as shown in FIG. 1. As shown, the fitness bumper 18 may include a rope station 29. The rope station 29 may include one or more exercise ropes 26, such as one or more battle ropes, stowed in a rope compartment 43. A rope compartment 43 may be located at a left and/or right side of the fitness bumper 18. A rope mount 30 may be located within the rope compartment 43. The rope mount 30 may include a "U-hook". The exercise ropes 26 may be coiled within a respective rope compartment 43. The rope compartment 43 may include a cover that hinges open, such as down, to access the rope compartment. The cover may be secured with a pin locking mechanism or the like.

Additionally, or in the alternative, a mobile fitness plaza 10 may include a suspension station 31 that includes one or more features configured and arranged as shown in FIG. 1. Additionally, or in the alternative, a mobile fitness plaza 10 may include a resting station 41 that includes one or more features configured and arranged as shown in FIG. 1. Additionally, or in the alternative, a mobile fitness plaza 10 may include a pull-up station 35 and/or a dipping station 46 that includes one or more features configured and arranged as shown in FIG. 1. Additionally, or in the alternative, a mobile fitness plaza 10 may include a plurality of storage hooks 38 and/or a plurality of storage racks 40 configured and arranged as shown in any one or more of the Figures, including FIG. 1. The plurality of storage hooks 38 and/or the plurality of storage racks 40 may include a kettlebell storage system configured to hold a plurality of kettlebells. The kettlebell storage system may include a plurality of attachments respectively configured to hold a kettlebell. A respective attachment may include a plate approximately 3-inches wide with a hook attached thereto.

As shown in the Figures, a mobile fitness plaza 10 may include one or more X-CREATE™ attachments. The one or more X-CREATE™ attachments may include one or more plyo-step attachments, one or more dip attachments, one or more multi-grip cross attachments, one or more ball targets, one or more horizontal mount ground rotational trainers, and so forth. As shown, the pull-up station 35 and/or the dipping station 46 may include such attachments, including one or more plyo-step attachment and/or one or more dip attachments. One or more of such attachments, such as one or more plyo-step attachments, may be modified to be fixed to the mobile fitness plaza 10 and/or to pivot into a stowed position and to be locked with a locking pin.

Figure 2A:
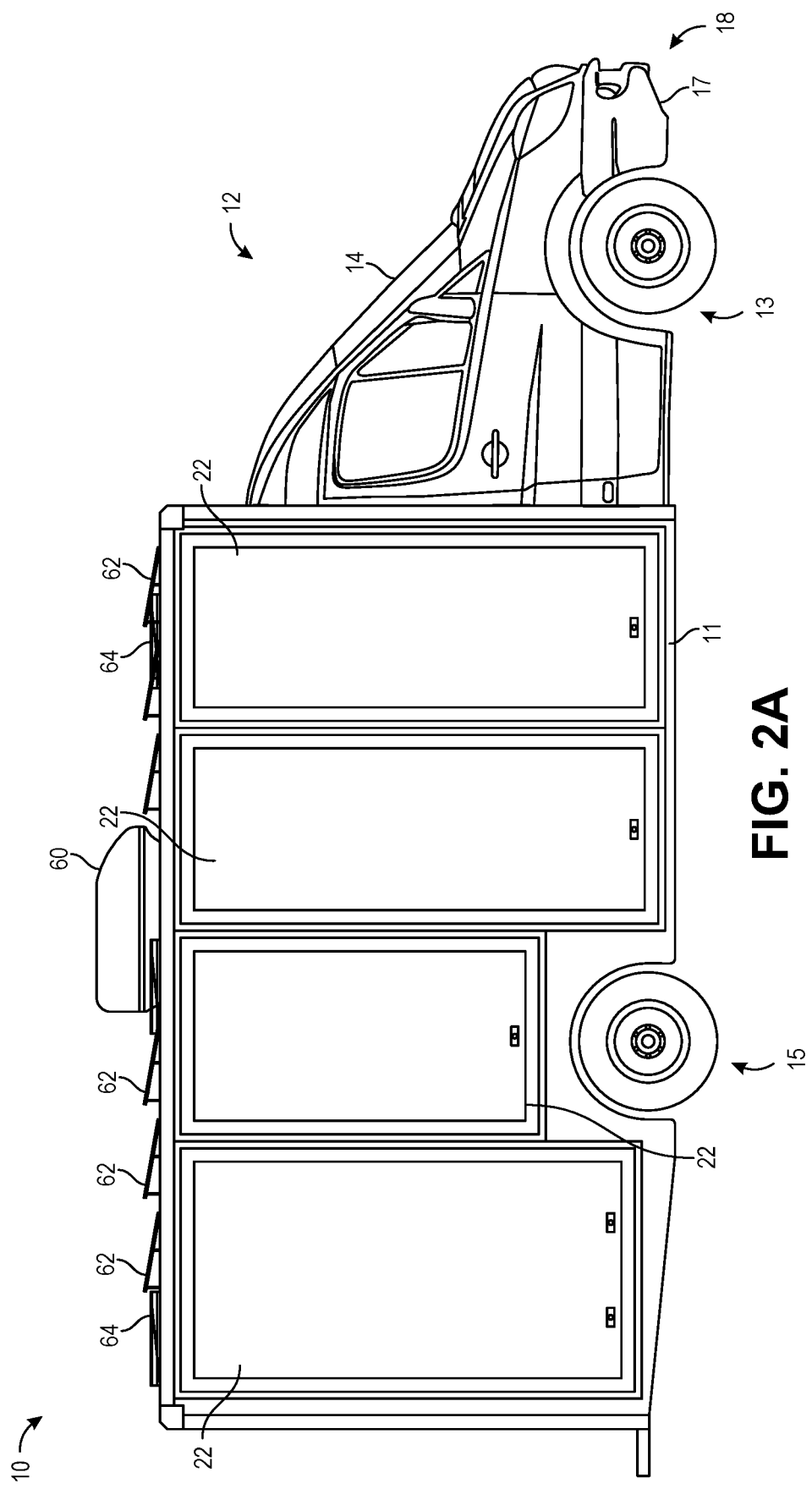
Figure 2B:
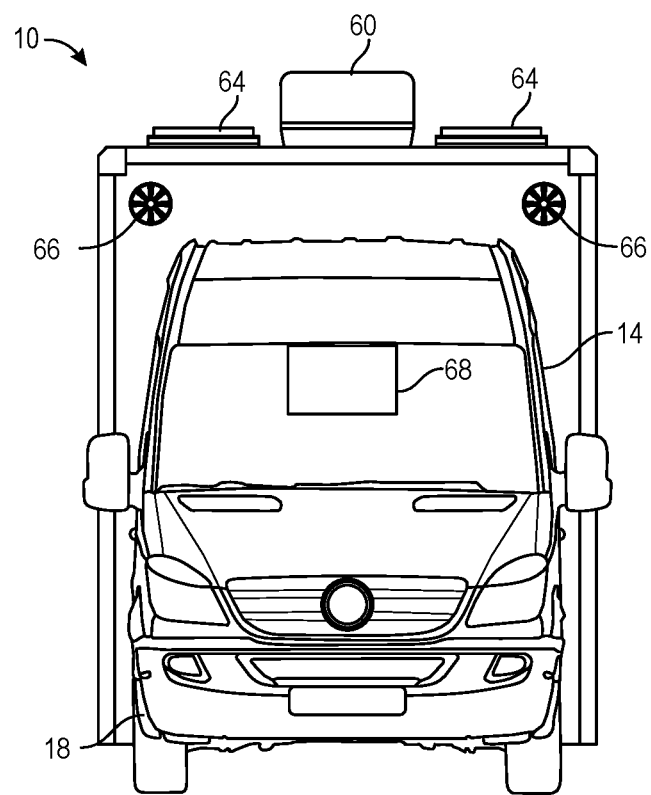
Figure 2C:
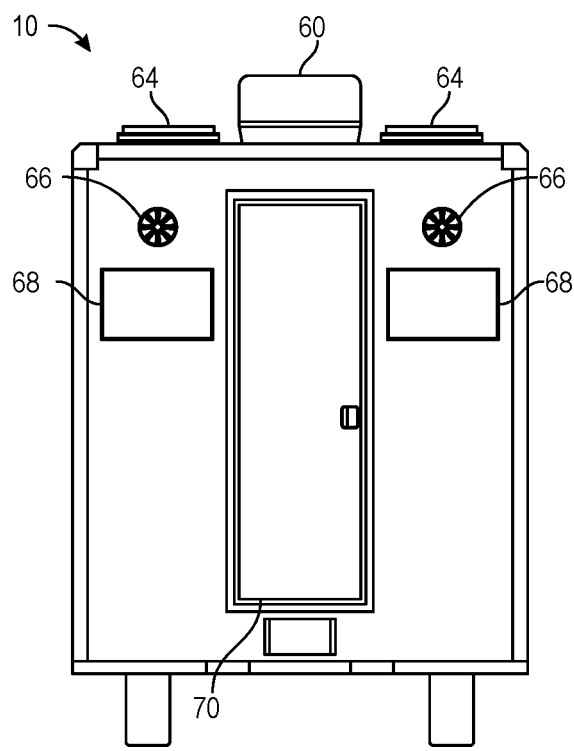

Referring now to FIGS. 2A-2C, example embodiments of the present disclosure are further described. In some embodiments, the mobile fitness plaza 10 may be incorporated into fitness vehicle 12, as shown. In some embodiments, at least a portion of the mobile fitness plaza 10, such as one or more fitness stations 20 thereof, may have a relatively low ground clearance. The relatively low ground clearance may accommodate relatively large exercise equipment, such as the barbell rack 44, the rowing machine 34, the exercise bench 32, and so forth. By way of example, a ground clearance of a portion of the mobile fitness plaza 10 and/or a fitness station 20 thereof may be determined with reference to an axle axis, such as an axis of a forward axle 13 or an axis of a rear axle adjacent to the respective portion of the mobile fitness plaza 10 and/or fitness station 20. In some embodiments, a portion of the mobile fitness plaza 10 and/or a fitness station 20 may have a bottom edge that is from 2 to 12 inches below an axle axis, such as from 2 to 6 inches, or such as from 6 to 12 inches below the axle axis. Additionally, or in the alternative, an alcove 23 may have a bottom edge that is from 2 to 12 inches below an axle axis, such as from 2 to 6 inches, or such as from 6 to 12 inches below the axle axis. In some embodiments, as shown, a mobile fitness plaza 10 may include a rear overhang that has a bottom edge that is sloped rearwardly upwards. The rearwardly upwards sloped bottom edge may provide suitable ground clearance when transporting the mobile fitness plaza 10, such as to avoid bottoming-out when travelling over various terrain. Further, embodiments are contemplated in which the at least one of the fitness stations have a bottom portion aligned above an axle axis or even with an axle axis.

In some embodiments, the mobile fitness plaza may include a climate control system 60. The climate control system 60 may be disposed on top of the mobile fitness plaza 10. In some embodiments, the climate control system 60 may be used to control a climate, such as a temperature and/or a humidity, within an interior region 72 of the mobile fitness plaza 10. Additionally, or in the alternative, the climate control system may be used to at least partially control a climate, such as a temperature and/or a humidity, in a region adjacent to one or more of the fitness stations 20. For example, the climate control system 60 may provide a supply of climate-controlled air through one or more vents that respectively discharge through one or more vents situated in proximity to a respective fitness station 20, such as to blow climate-controlled air onto athletes during use of the fitness stations 20. In some embodiments the one or more vents may be disposed within an alcove 23. Additionally, or in the alternative, the one or more vents may be disposed about an awning 22. For example, a flexible duct may be attached to an awning 22, and/or the awning 22 may include an internal duct, that supplies conditioned air in proximity to the fitness station 20, such as a region below the awning 22. The conditioned air may include cooled air and/or heated as may be suitable for various weather conditions. Additionally, or in the alternative, the conditioned air may include humidified air and/or dehumidified air as may be suitable for various weather conditions. Additionally, or in the alternative, the conditioned air may include mist or atomized vapor, such as to provide improved heat transfer from athletes' bodies. In some embodiments, the climate control system 60 may include one or more circulation fans. The circulation fans may be incorporated into a wall of an alcove 23 such that when the awnings 22 are in a deployed position, climate conditioned air may be projected outwards onto athletes when using the fitness station 20 associated with the alcove 23.

In some embodiments, one or more solar panels 62 may be disposed about the mobile fitness plaza 10, such as on top of the mobile fitness plaza 10. Additionally, or in the alternative, one or more solar panels may be disposed about an external side of one or more awnings 22. Energy from the solar panels 62 may be used, directly or indirectly, to provide electrical power to the mobile fitness plaza 10, to one or more of the fitness stations 20, to electrical systems or components thereof, and/or to electrically-powered equipment associated therewith. Additionally, or in the alternative, energy from the solar panels 62 may be used, directly, or indirectly, to provide power to operate the fitness vehicle 12 and/or electrical systems or components thereof, and/or to electrically-powered equipment associated therewith. For example, in some embodiments, the fitness vehicle 12 may be an electric or hybrid-electric vehicle that receives at least some electrical power, directly or indirectly, from the solar panels 62. The one or more solar panels 62 may be electrically coupled to one or more power storage banks, such as one or more batteries, one or more supercapacitors, or the like. Electrical energy generated by the solar panels 62 may be used to charge the one or more power storage banks. The power storage banks may store electrical energy generated by the one or more solar panels 62. The power storage banks may be used to provide electrical power to the mobile fitness plaza 10 and/or to the fitness vehicle 12, such as to the one or more of the fitness stations 20, to the electrical systems or components thereof, and/or to electrically-powered equipment associated therewith. In some embodiments, the solar panels 62 may be adjustable such that the angle of the solar panels 62 may be adjusted automatically or manually to follow sunlight. In some embodiments, one or more lights 64 may be disposed about the mobile fitness plaza 10, such as within one or more of the alcoves 23 and/or about an exterior of the mobile fitness plaza 10 (e.g., on the top of the mobile fitness plaza 10, on an inward or outward wall of one or more awnings 22, and/or on one or more sides of the mobile fitness plaza 10). The lights 64 may receive electrical power from the power storage banks. In some embodiments, control of the one or more lights 64 may be provided by one or more lighting controls disposed within the cab 14, remotely, for example, via a key fob or a mobile application, or externally using an external lighting control disposed within one of the alcoves 23.

In some embodiments, a mobile fitness plaza 10 may include video and/or audio equipment, such as one or more display screens 68, one or more speakers 66, and associated equipment. The one or more display screens 68 and/or the one or more speakers 66 may be operated synchronously and/or independently. The video and/or audio equipment may be powered by the power storage banks. In some embodiments, the video and/or audio equipment may be housed behind a protective screen, such as a clear acrylic screen, for example, to protect the equipment from weather and/or damage. In some embodiments, the mobile fitness plaza 10 may include one or more tablets or other computer devices that may be used, for example, to operate video and/or audio equipment, to operate exercise equipment 21, and/or to log exercise data, and so forth. In some embodiments, the mobile fitness plaza 10 may include one or more power outlets, such as within an alcove 23 and/or at a location adjacent to a fitness station 20.

In some embodiments, the mobile fitness plaza 10 includes a video display screen 68, such as a television display that is mounted in the cab of the vehicle and oriented to be forward-facing towards a windshield of the vehicle such that the video display screen 68 is visible to one or more users positioned outside and in front of the vehicle. For example, the forward-facing video display screen 68 may be positioned such that the one or more users are able to watch the video display screen 68 while performing exercises with equipment attached to the modified bumper portion of the vehicle.

Figure 3:
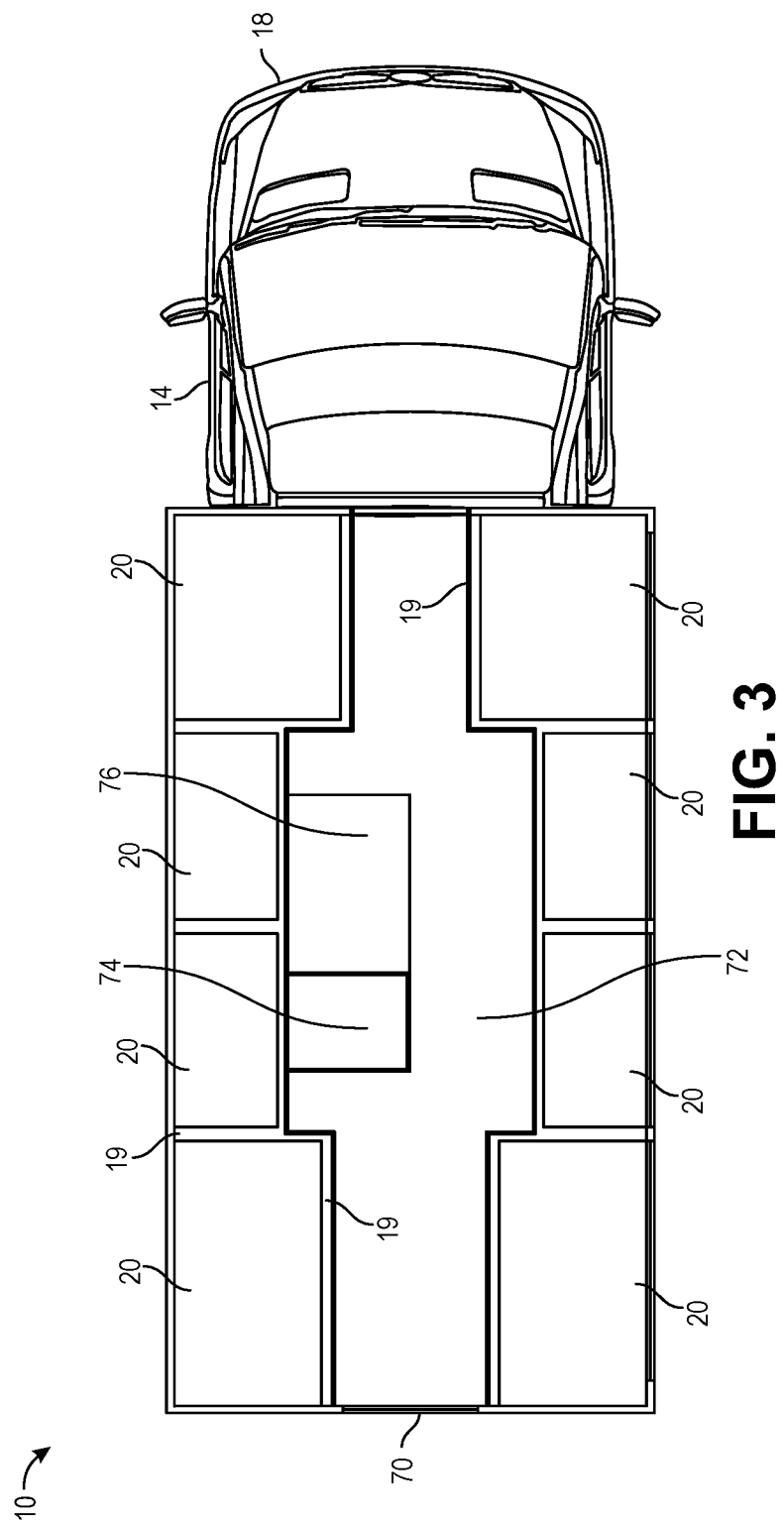

Referring now to FIG. 3, an exemplary floor plan of a mobile fitness plaza 10 is shown. As shown in FIG. 3, a mobile fitness plaza 10 may include an interior region 72. The interior region 72 may be at least partially surrounded by a plurality of alcoves 23. The interior region 72 may include a refrigerator 74 and/or a desk 76. The interior region 72 may be used to stow various items of equipment 21. The interior region 72 may be accessed by one or more doors 70, as shown, for example, in FIG. 2C. The interior region may include one or more access panels, such as in the floor of the interior region, to access the power storage banks. The mobile fitness plaza 10 may have dimensions selected at least in part based on the number of fitness stations 20 and/or the equipment 21 associated with the respective fitness stations. Additionally, or in the alternative, the dimensions of a mobile fitness plaza 10 may be selected at least in part based on the size of the alcoves 23 that may be suitable for storing equipment 21 therein, such as in a manner that allows the equipment 21 to be articulated from a stowed position within the alcove 23 to a deployed position adjacent to the alcove 23.

In various embodiments, a mobile fitness plaza 10 may include, and/or may be incorporated into a motor vehicle, such as a van, a truck, a sport-utility vehicle (SUV), a special purpose vehicle, or other suitable motor vehicle that has a gross vehicle weight rating suitable for the size and/or weight of the mobile fitness plaza 10. By way of example, the mobile fitness plaza 10 shown in FIG. 1 may include and/or may be incorporated into a vehicle 12 that has a medium-duty commercial classification, such as a Class 3, Class 4, Class 5, or Class 6 medium-duty classification. A relatively smaller-capacity mobile fitness plaza 10 may include and/or may be incorporated into a vehicle 12 that has a light-duty commercial classification, such as a Class 1, Class 2A, or Class 2B light-duty classification. A relatively larger-capacity mobile fitness plaza 10 may include and/or may be incorporated into a vehicle 12 that has a heavy-duty commercial classification, such as a Class 7 or Class 8 heavy-duty classification. A vehicle with any other classification suitable for the size and/or weight of the mobile fitness plaza 10 may be utilized, such as a standard or small SUV; a minivan; a large, mid-size, or compact car; a subcompact or minicompact car; a motorcycle or off-road-vehicle, such as a two-, three-, or four-wheel vehicle; a bus, such as a coach, a school bus, a shuttle bus, a minicoach; an extended vehicle, such as a limousine; as well as combinations of these. In some embodiments, a mobile fitness plaza 10 and/or a fitness vehicle 12 may include and/or may be incorporated into a trailer, such as a trailer towable by a suitable vehicle 12. In still further embodiments, a mobile fitness plaza 10 and/or a fitness vehicle 12 may include and/or may be incorporated into a rail car, a marine vessel, a storage container, a human-powered vehicle, or an aircraft. In some embodiments, such as when the mobile fitness plaza 10 is incorporated into a fitness vehicle 12 that is drivable, the mobile fitness plaza 10 may include a cab 14. As shown, the cab 14 may be located at a frontward portion of the fitness plaza 10. In other embodiments, the cab 14 may be located at a midward portion or a rearward portion of the mobile fitness plaza 10.

Figure 4:
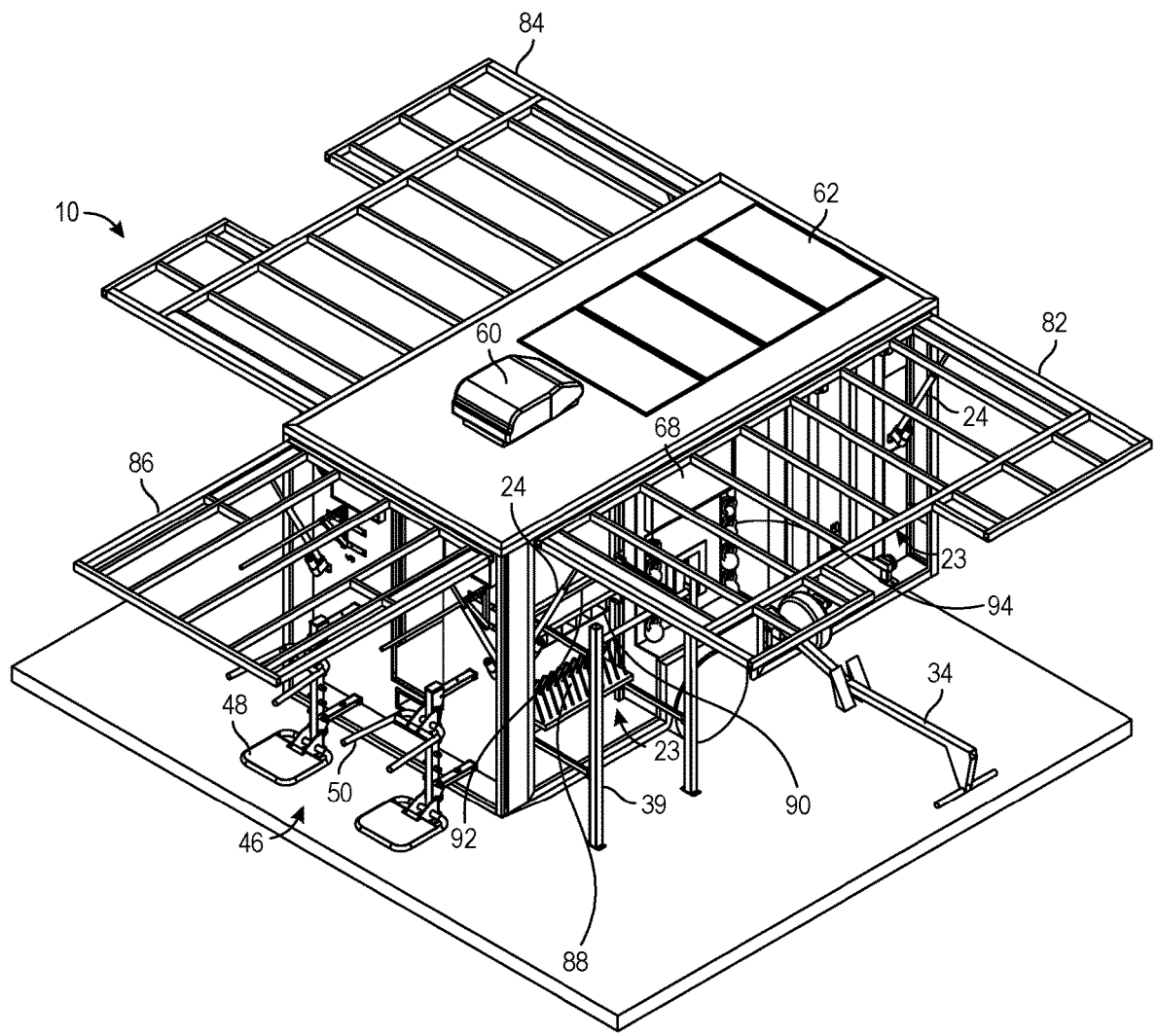
FIG. 4 illustrates an exemplary mobile fitness plaza relating to some embodiments of the present disclosure.

Referring now to FIG. 4, an exemplary mobile fitness plaza 10 is illustrated relating to some embodiments of the present disclosure. In some such embodiments, the mobile fitness plaza 10 includes one or more awnings. For example, the mobile fitness plaza 10 may include a first side awning 82 disposed at a first side of the mobile fitness plaza 10, a second side awning 84 disposed at a second side of the mobile fitness plaza and a rear awning 86 disposed at a rear side of the mobile fitness plaza 10. The awnings 82, 84, and 86 shown are illustrated with just a frame portion of each respective awning being visible. However, it should be understood that this is just an exemplary illustration and that a plate covering may be disposed over the frame portion such that light and objects may not pass through the awning. For example, in some embodiments, the awnings 82, 84, and 86 include an aluminum covering, which may be decorated with branding information, advertisements, and other forms of decoration. In some embodiments, the covering of the awning may be formed of an ultraviolet (UV)-resistant material to prevent sunlight from passing through the awnings.

Each of the first side awning 82 and the second side awning 84 may extend a substantial portion of the length of the mobile fitness plaza 10. Accordingly, the awnings 82 and 84 may be configured to provide shelter and shade to an area below each respective awning 82, 84. Additionally, a single awning at each side of the mobile fitness plaza 10 simplifies the process of deploying the awnings and accessing the exercise equipment disposed in the alcoves 23. For example, the alcoves 82, 84, and 86 may be selectively positioned between a stowed position in which the alcoves provide an enclosure and close over one or more of the alcoves 23 and a deployed position in which the alcoves project outward from a top portion of the mobile fitness plaza 10. In some embodiments, the alcoves 82, 84, and 86 may be configured to be locked into the deployed position at about a 90 degree angle such that the alcoves 82, 84, and 86 are positioned flush with a top surface of the mobile fitness plaza 10.

The side awnings 82 and 84 may be configured to close over two or more alcoves 23, as opposed to the awnings 22, as shown in FIG. 1, which are configured to close over a single alcove 23. Further, the larger awnings 82 and 84 provide additional shaded coverage and do not have gaps for light to pass through. Further still, the awnings 82, 84, and 86 are configured to prevent rain and other forms of precipitation from falling upon users at the fitness stations. Additionally, the awnings 82, 84, and 86 may prevent debris from contacting the users and the exercise equipment.

In some embodiments, each of the awnings 82, 84, and 86 are configured to be supported by the one or more support elements 24, as shown. For example, the one or more support elements 24 may include any of a hydraulically or electrically actuated cylinder for supporting the awnings in the deployed upright position or for selectively opening and closing the awnings 82, 84, and 86. For example, in some embodiments, the one or more support elements 24 are selectively actuated such as by using one or more electric or hydraulic motors responsive to a user input. In one example, a user may provide said user input for opening/closing the awnings remotely via a button or other input mechanism attached to a vehicle key fob associated with the vehicle 12. Alternatively, or additionally, the user input may be provided via a button or input mechanism secured directly to the mobile fitness plaza 10 or fitness vehicle 12. Further still, in some embodiments, the user input may be provided via an application running on a smart phone or other mobile computing device.

In some embodiments, any of the awnings 82, 84, and 86 may comprise one or more electronic locks for locking the awnings in the stowed position. For example, an electronic deadbolt lock may be included at an end of each awning such that the deadbolt lock interfaces with a portion of the frame while the awnings are in the stowed position. Accordingly, the electronic deadbolt may be used to selectively lock and unlock the awnings to provide security to equipment stored within the alcoves 23. Additionally, or alternatively, other suitable forms of locking the awnings are contemplated, for example, any of mechanical, hydraulic, or magnetic locking mechanisms may be used.

The mobile fitness plaza 10, as shown in FIG. 4, may include any number of the components described above, such as the rowing machine 34, powerlifting station 39, dipping station 46, one or more platforms 48, one or more dipping handles 50, climate control system 60, and solar panels 62. It should be understood that any of said components may be arranged differently than as shown. For example, the power lifting station 39 may be disposed in the rear most alcove 23, as shown, or in another alcove of the mobile fitness plaza 10, such as the front most alcove.

In some embodiments, the mobile fitness plaza 10 comprises a barbell storage 88, as shown. For example, the barbell storage 88 may be disposed within at least one of the alcoves 23 and mounted to either or both of a side wall and back wall of the respective alcove 23. In some such embodiments, the barbell storage 88 is configured to support a plurality of barbells such that the barbells can be stored within the respective alcove 23.

In some embodiments, a vertical dumbbell storage 90 is included. The vertical dumbbell storage 90 comprises a rigid frame including one or more slots for dumbbells to be placed in such that the dumbbells are suspended from a top portion of the respective dumbbell. Accordingly, the one or more slots comprise a cutaway portion sized for receiving the dumbbells. For example, said cutaway portion may be wider than a diameter of a handle portion of the dumbbell but narrower than a dumbbell head of the dumbbell.

In some embodiments, a medicine ball storage 92 is included on the mobile fitness plaza 10. The medicine ball storage 92 may comprise a horizontally oriented rod extending a substantial portion of the width of the respective alcove 23 configured to hold one or more medicine balls in place within the alcove 23. In some embodiments, the medicine ball storage 92 may be disposed above the vertical dumbbell storage 90, as shown. Further, embodiments are contemplated in which the medicine ball storage 92 is integrated directly into a top portion of the vertical dumbbell storage 90 such that the one or more medicine balls rest on a top surface of the vertical dumbbell storage 90 and are held in place by the horizontal rod of the medicine ball storage 92.

In some embodiments, the mobile fitness plaza 10 comprises a kettlebell storage 94, as shown. For example, the kettlebell storage 94 comprises a plurality of hooks for receiving handles of a respective plurality of kettlebells. In some embodiments, the kettlebell storage 94 may be mounted to a back wall of one of the alcoves 23, for example, within the alcove that includes the video display screen 68, as shown.

Figure 5:
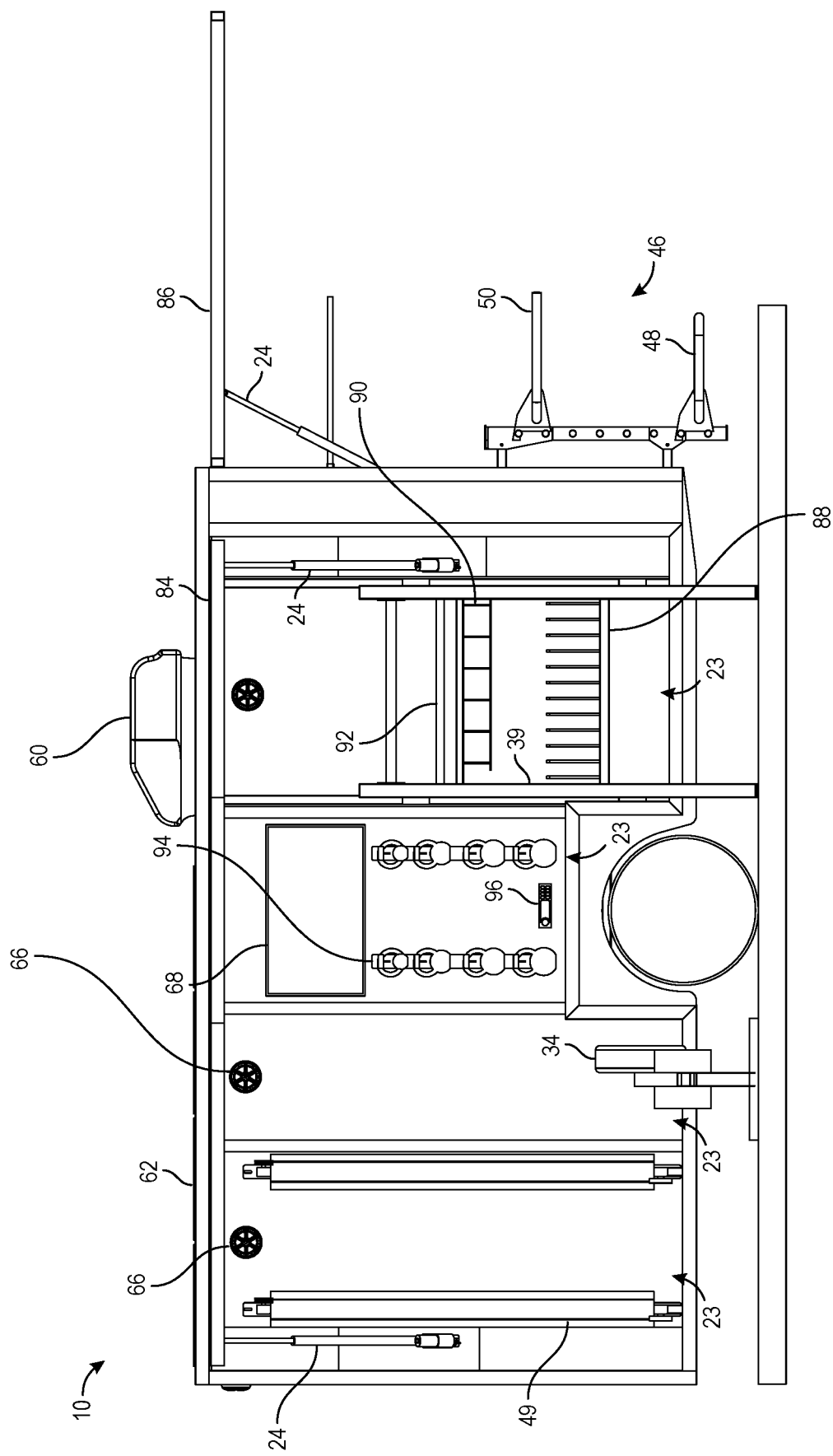
FIG. 5 illustrates a side view of an exemplary mobile fitness plaza relating to some embodiments of the present disclosure.

Referring now to FIG. 5, a side view of an exemplary mobile fitness plaza 10 is illustrated relating to some embodiments of the present disclosure. The mobile fitness plaza 10 comprises awnings 82 (not shown), 84, and 86, as described above. The mobile fitness plaza 10 further comprises a plurality of alcoves 23, the one or more support elements 24, the rowing machine 34, the powerlifting station 39, the one or more cable towers 49, the dipping station 46 with the one or more platforms 48 and one or more dipping handles 50, the climate control system 60, the solar panels 62, the one or more speakers 66, the video display screen 68, the vertical dumbbell storage 90, the medicine ball storage 92, and the kettlebell storage 94, as shown and described above.

Additionally, or alternatively, in some embodiments, an audio input control device 96 is included in the mobile fitness plaza 10. For example, the audio input control device 96 may be configured to receive one or more user inputs for adjusting audio controls of the mobile fitness plaza 10. In some such embodiments, the audio input control device 96 may be coupled to the one or more speakers 66 mounted on the mobile fitness plaza 10 such that the audio input control device 96 controls audio of the one or more speakers 66. Further, in some embodiments, the audio input control device 96 is also coupled to the video display screen 68.

The dipping station 46 is shown in a deployed position, however, it should be understood that the dipping station 46 is configured to be folded into a stowed position such that the dipping station 46 with the one or more platforms 48 and one or more dipping handles 50 fits inside of the closed awning 86 with the one or more platforms 48 and one or more dipping handles 50 folded into an upright position. Accordingly, the one or more platforms 48 and one or more dipping handles 50 may be rotatably coupled to one or more pins disposed on a frame of the dipping station 46, as shown.

Additionally, in some embodiments, the components shown in FIG. 5 may be mirrored on an opposing side of the mobile fitness plaza 10. Alternatively, in some other embodiments, the components may be arranged differently or entirely different equipment may be stored on the opposing side.

Figure 6:
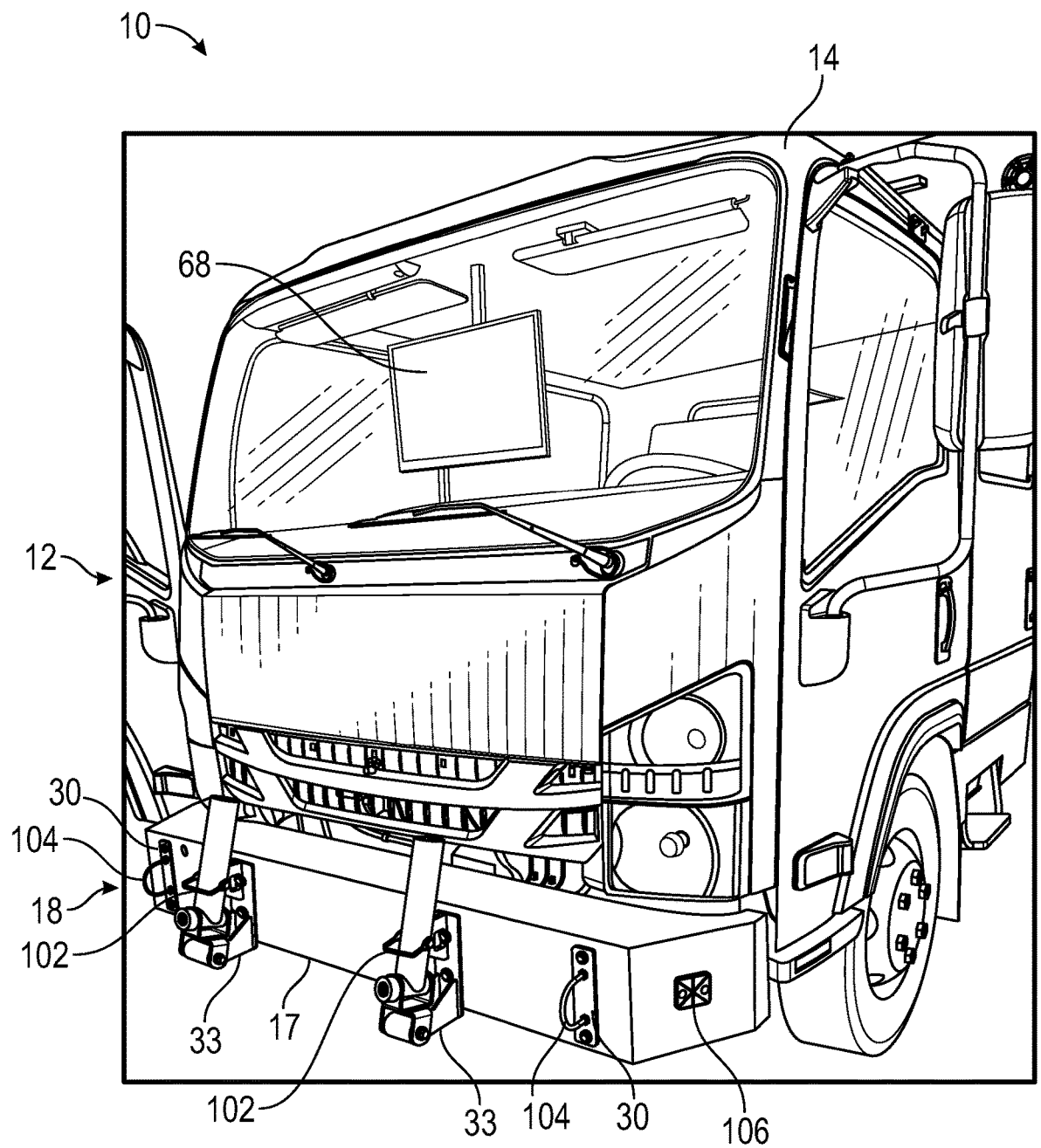
FIG. 6 illustrates a view of a front portion of an exemplary mobile fitness plaza relating to some embodiments of the present disclosure.

Referring now to FIG. 6, a view of a front portion of an exemplary mobile fitness plaza 10 is illustrated relating to some embodiments of the present disclosure. The mobile fitness plaza 10 includes the fitness vehicle 12 with the fitness bumper 18 disposed on the bumper portion 17 of the fitness vehicle 12, as shown. In some embodiments, a video display screen 68 is disposed in the cab 14. Said video display screen 68 may be front facing such that the video display screen 68 is visible to one or more users positioned in front of the mobile fitness plaza 10. In some embodiments, the video display screen 68 may be mounted to a bracket secured to a roof portion of the cab 14, as shown. Further, the video display screen 68 (and the bracket) may be pivotably coupled such that the video display screen 68 can be adjusted into a stowed position while driving as to not obstruct a view of a driver of the vehicle 12.

In some embodiments, one or more pivotable barbell stations 33 may be pivotably mounted to the fitness bumper 18, as shown. For example, the each of the one or more pivotable barbell stations 33 may comprise a barbell sleeve configured to receive an end of an exercise bar. Said barbell sleeve may be pivotably attached to the bumper portion 17 such that the barbell sleeve can be stowed in an upright position when not in use, for example, while the vehicle 12 is in motion. In some embodiments, the pivotable barbell stations 33 further comprise at least one latch 102 configured to selectively secure the barbell sleeve in the upright stowed position while the vehicle 12 is in motion.

In some embodiments, the mobile fitness plaza 10 further includes one or more rope mounts 30 disposed on the fitness bumper 18. For example, the rope mount 30 may include a loop 104 configured to receive at least one exercise rope such as the one or more exercise ropes 26 as described above. However, it should be understood that, in some embodiments, additionally, or in the alternative, the rope mount 30 may be disposed elsewhere within the mobile fitness plaza 10. For example, embodiments are contemplated in which the rope mount 30 including the loop 104 is disposed beneath the kettlebell storage 94 on a top surface of a wheel well of the vehicle 12. Additionally, in some embodiments, the mobile fitness plaza 10 further comprises one or more mounting adapters 106 configured to interface with one or more exercise devices. For example, the mounting adapter 106 may be configured to interface with an exercise cable device such that the exercise cable device can be selectively mounted onto the fitness bumper 18.

Figure 7:
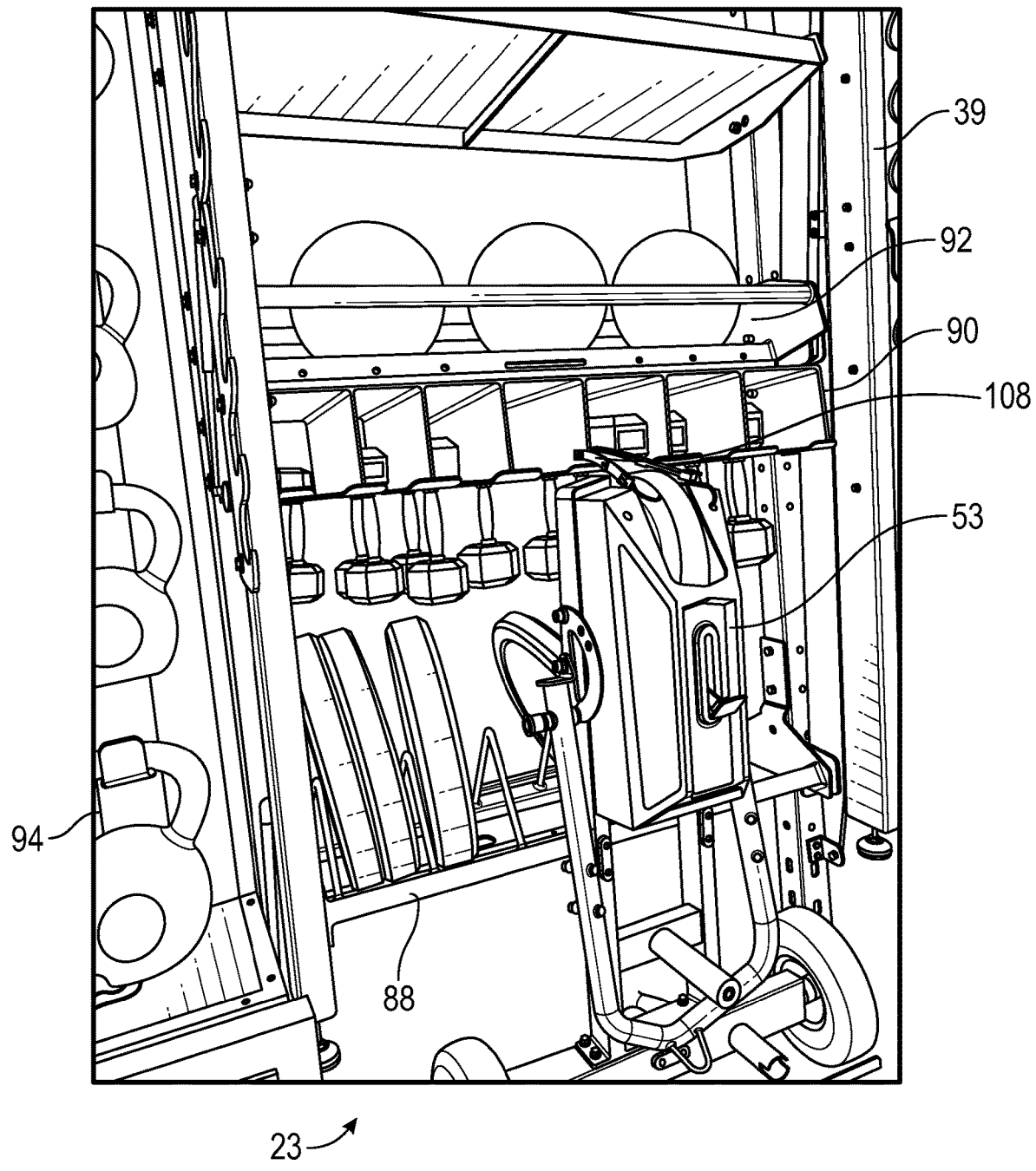
FIG. 7 illustrates an exemplary alcove compartment relating to some embodiments of the present disclosure.

Referring now to FIG. 7, an exemplary alcove compartment 23 is illustrated relating to some embodiments of the present disclosure. The alcove compartment 23 comprises the powerlifting station 39, the vertical dumbbell storage 90, and the medicine ball storage 92 disposed therein. Additionally, the exercise sled 53 may be stored in the alcove compartment 23 while not in use, as shown. Further, the kettlebell storage 94 may be mounted within an adjacent alcove, as shown.

In some embodiments, the barbell storage 88 is configured to receive a plurality of barbells, as shown. For example, one or more protrusions may be included within the barbell storage 88 for supporting the barbells in an upright position during storage. In some embodiments, the barbell storage 88 may be disposed within the alcove 23 below the vertical dumbbell storage 90 positioned beneath the vertical dumbbell storage 90 with enough clearance space such that the dumbbells hanging from the vertical dumbbell storage 90 do not contact the barbells stored in the barbell storage 88, as shown.

In some embodiments, the vertical dumbbell storage 90 is disposed within the alcove 23, as shown. The vertical dumbbell storage 90 may include the rigid frame with a plurality of slots, each respective slot comprising a cutaway portion for receiving a handle portion of at least one dumbbell. Further, in some embodiments, the vertical dumbbell storage 90 may be sloped upwards at a front most face of the frame such that the dumbbells, when stored, are biased towards a back portion of the vertical dumbbell storage 90 to thereby prevent the dumbbells from being unintentionally removed from the vertical dumbbell storage 90. For example, the dumbbells are biased towards a back portion of the vertical dumbbell storage 90 to prevent the dumbbells from being jostled loose while the vehicle 12 is in motion.

In some embodiments, the medicine ball storage 92 is integrated into a top portion of the vertical dumbbell storage 90 such that there is no gap or space between the vertical dumbbell storage 90 and the medicine ball storage 92. Alternatively, in some embodiments, the vertical dumbbell storage 90 and the medicine ball storage 92 are separate structural components and may even be disposed in distinct alcoves 23 of the mobile fitness plaza 10. The medicine ball storage 92 may include a base portion that is sloped upwards at a front most face of the base portion to bias one or more medicine balls disposed thereon toward a back wall of the alcove 23 to prevent the medicine balls from being jostled loose while the vehicle 12 is in motion, similar to the frame of the vertical dumbbell storage 90, as described above.

In some embodiments, the exercise sled 53 may be disposed within the alcove 23 for storage. For example, the exercise sled 53 may be placed in the alcove 23 on a floor portion of the alcove 23. Further, the exercise sled 53 may be removably secured in place using at least one bungie cord 108 mounted to the frame of the vertical dumbbell storage 90, as shown. For example, the bungie cord 108 may be secured to an opening within the frame of the vertical dumbbell storage 90. Further, embodiments are contemplated in which other attachment means, not explicitly described herein may be secured to the opening of the frame of the vertical dumbbell storage 90.

In some embodiments, the mobile fitness plaza 10 further comprises any number of additional features and components. For example, embodiments are contemplated in which the mobile fitness plaza 10 includes one or more external fans disposed, for example, within one or more of the alcoves 23. The one or more fans may be configured to direct cooling air outwards from the mobile fitness plaza 10 to users of the one or more fitness stations. Further, in some embodiments, the mobile fitness plaza 10 further comprises one or more external misters configured to spray cooling water onto one or more users standing outside of the mobile fitness plaza 10. In some such embodiments, the one or more misters may be coupled to a water cooling system of the mobile fitness plaza 10 such as a water cooler attached to the beverage dispenser 36. In some embodiments, the mobile fitness plaza 10 further comprises at least one security camera. For example, a 360 degree security camera may be disposed on a top surface of the back portion of the vehicle 12.

Further, in some embodiments, additional features may be integrated into the components described above with respect to the mobile fitness plaza 10. For example, in some embodiments, a shock system may be integrated into any of the exercise equipment pivotably mounted within the alcoves 23 such that the shock system provides a biasing force to assist the exercise equipment into the upright stowed position. Said biasing force may further prevent unintentional deployment of the exercise equipment from the alcoves 23. Further still, in some embodiments, other means for holding the exercise equipment in the stowed position are also contemplated. For example, in some embodiments, any combination of locks, latches, clips, bungie cables, straps, or other suitable locking means are contemplated.

Although the presently disclosed subject matter has been described with reference to the embodiments illustrated in the attached drawing figures, it is noted that equivalents may be utilized and substitutions made herein without departing from the scope of the invention recited in the claims.

Having thus described various embodiments of the invention, what is claimed as new and desired to be protected by Letters Patent includes the following:

1. A mobile fitness plaza configured to be mounted onto a vehicle with a cab portion, a front portion, and a rear portion, wherein when mounted on the vehicle, the mobile fitness plaza comprising:
   a modified front bumper disposed on the front portion of the vehicle, the modified front bumper comprising a mounting adapter configured to interface with one or more exercise equipment devices;
   a frame disposed at the rear portion of the vehicle;
   a plurality of alcove compartments disposed at the rear portion of the vehicle and supported on the frame, the plurality of alcove compartments configured to store exercise equipment disposed therein; and
   one or more hinged awnings rotatably secured to a top portion of one or more of the plurality of alcove compartments,
   wherein the one or more hinged awnings are selectively rotated between a stowed position in which the one or more hinged awnings provide an enclosure for one or more of the plurality of alcove compartments and a deployed position in which the one or more hinged awnings provide shelter to an area below the one or more hinged awnings.

2. The mobile fitness plaza of claim 1, further comprising:
   a forward-facing television display mounted in the cab portion of the vehicle such that the forward-facing television display is visible to one or more users positioned in front of the vehicle.

3. The mobile fitness plaza of claim 2, further comprising:
   a pivotable barbell station comprising:
      a barbell sleeve pivotably mounted to the modified front bumper and configured to receive an end of an exercise bar during use; and
      a latch configured to hold the barbell sleeve in an upright stowed position while the vehicle is in motion.

4. The mobile fitness plaza of claim 3, further comprising:
   a rope mount disposed on the modified front bumper, the rope mount comprising a loop for receiving at least one exercise rope during use.

5. The mobile fitness plaza of claim 1, further comprising:
   one or more storage hooks secured to a wall of at least one of the plurality of alcove compartments.

6. The mobile fitness plaza of claim 1, further comprising:
   a vertical dumbbell storage disposed in a respective alcove compartment of the plurality of alcove compartments, the vertical dumbbell storage comprising:
      a rigid frame mounted to a wall of the respective alcove compartment; and
      a plurality of slots, each of slot of the plurality of slots comprising a cutaway portion configured to receive a handle portion of one or more dumbbells such that the one or more dumbbells are suspended in an upright position within the vertical dumbbell storage.

7. The mobile fitness plaza of claim 1, wherein the one or more exercise equipment devices is at least an exercise cable device.

8. A mobile fitness plaza configured to be coupled to a frame mounted to a vehicle, wherein when coupled to the frame, the mobile fitness plaza comprising:
   a plurality of alcove compartments supported on the frame, the plurality of alcove compartments configured to store exercise equipment disposed therein;
   one or more storage hooks secured to a wall of at least one of the plurality of alcove compartments; and
   one or more hinged awnings rotatably secured to a top portion of one or more of the plurality of alcove compartments,
   wherein the one or more hinged awnings are selectively rotated between a stowed position in which the one or more hinged awnings provide an enclosure for one or more of the plurality of alcove compartments and a deployed position in which the one or more hinged awnings provide shelter to an area below the one or more hinged awnings.

9. The mobile fitness plaza of claim 8, wherein the mobile fitness plaza is integrated into a vehicle trailer configured to be pulled by the vehicle.

10. The mobile fitness plaza of claim 8, further comprising:
    a vertical dumbbell storage disposed in a respective alcove compartment of the plurality of alcove compartments, the vertical dumbbell storage comprising:
       a rigid frame mounted within the respective alcove compartment; and
       a plurality of slots disposed within the rigid frame, each slot of the plurality of slots comprising a cutaway portion configured to receive a handle portion of one or more dumbbells such that the one or more dumbbells are suspended in an upright position within the vertical dumbbell storage.

11. The mobile fitness plaza of claim 10, further comprising:
    a medicine ball storage integrated into a top portion of the vertical dumbbell storage, the medicine ball storage comprising:
       a horizontally oriented rod extending a substantial portion of a width of the respective alcove compartment and configured to hold one or more medicine balls in place while the vehicle is in motion.

12. The mobile fitness plaza of claim 11, wherein the rigid frame of the vertical dumbbell storage comprises at least one opening for receiving an exercise attachment.

13. The mobile fitness plaza of claim 8, further comprising:
    a kettlebell storage rack mounted to a wall of a respective alcove compartment of the plurality of alcove compartments, the kettlebell storage rack comprising:
       a plurality of hooks, wherein each hook of the plurality of hooks is configured to receive a handle portion of a respective kettlebell such that the respective kettlebell is suspended on the kettlebell storage rack while the vehicle is in motion.

14. The mobile fitness plaza of claim 8, wherein the one or more hinged awnings are selectively rotated between the stowed position and the deployed position responsive to a remote user input from a key fob associated with the vehicle.

15. A system comprising:
    a vehicle comprising:
       a front portion comprising:
          a cab; and
          a modified front bumper comprising a mounting adapter configured to interface with one or more exercise equipment devices; and
       a rear portion; and
    a mobile fitness plaza mounted onto the vehicle, the mobile fitness plaza comprising:
       a frame disposed within the rear portion of the vehicle; and a plurality of alcove compartments disposed within the rear portion of the vehicle and supported on the frame, the plurality of alcove compartments configured to store exercise equipment disposed therein.

16. The system of claim 15, wherein the mobile fitness plaza further comprises:
a plurality of hinged awnings that are rotatably secured to a top portion of one or more of the plurality of alcove compartments,
wherein the plurality of hinged awnings is selectively rotated between a stowed position in which the plurality hinged awnings provide an enclosure for one or more of the plurality of alcove compartments and a deployed position in which the plurality of hinged awnings provides shelter to an area below the plurality of hinged awnings.

17. The system of claim 16, wherein the plurality of hinged awnings comprises:
a first hinged awning disposed at a first side of the rear portion of the vehicle, wherein the first hinged awning is configured to cover a first portion of the plurality of alcove compartments disposed at the first side of the rear portion of the vehicle; and
a second hinged awning disposed at a second side of the rear portion of the vehicle, wherein the second hinged awning is configured to cover a second portion of the plurality of alcove compartments disposed at the second side of the rear portion of the vehicle.

18. The system of claim 17, wherein the plurality of hinged awnings further comprises:
a third hinged awning disposed at a rear side of the rear portion of the vehicle, wherein the third hinged awning is configured to cover a third portion of the plurality of alcove compartments disposed at the rear side of the rear portion of the vehicle.

19. The system of claim 15, further comprising:
at least one dipping exercise station disposed at the rear portion of the vehicle, the at least one dipping exercise station comprising:
one or more supporting arms pivotably mounted to a back wall of a rear side of the rear portion of the vehicle;
a rigid vertical frame portion pivotably secured to the one or more supporting arms, the rigid vertical frame portion including a plurality of horizontal pins secured thereto;
one or more dipping handles pivotably secured to the rigid vertical frame portion via two or more of the plurality of horizontal pins; and
one or more platforms pivotably secured to the rigid vertical frame portion via two or more of the plurality of horizontal pins.

20. The system of claim 19, wherein the at least one dipping exercise station is configured to be adjusted into a stowed position with the one or more supporting arms, the one or more dipping handles, and the one or more platforms rotated into an upright orientation such that the at least one dipping exercise station is folded into a rear alcove of the plurality of alcove compartments while the vehicle is in motion.

21. A mobile fitness plaza configured to be mounted onto a vehicle with a cab portion, a front portion, and a rear portion, wherein when mounted on the vehicle, the mobile fitness plaza comprising:
a frame disposed at the rear portion of the vehicle;
a plurality of alcove compartments disposed at the rear portion of the vehicle and supported on the frame, the plurality of alcove compartments configured to store exercise equipment disposed therein;
at least one of a vertical dumbbell storage or a kettlebell storage rack,
wherein the vertical dumbbell storage is disposed in a respective alcove compartment of the plurality of alcove compartments, the vertical dumbbell storage comprising:
a rigid frame mounted to a wall of the respective alcove compartment; and
a plurality of slots, each of slot of the plurality of slots comprising a cutaway portion configured to receive a handle portion of one or more dumbbells such that the one or more dumbbells are suspended in an upright position within the vertical dumbbell storage,
wherein the kettlebell storage rack is mounted to a wall of a respective alcove compartment of the plurality of alcove compartments, the kettlebell storage rack comprising:
a plurality of hooks, wherein each hook of the plurality of hooks is configured to receive a handle portion of a respective kettlebell such that the respective kettlebell is suspended on the kettlebell storage rack while the vehicle is in motion; and
one or more hinged awnings rotatably secured to a top portion of one or more of the plurality of alcove compartments,
wherein the one or more hinged awnings are selectively rotated between a stowed position in which the one or more hinged awnings provide an enclosure for one or more of the plurality of alcove compartments and a deployed position in which the one or more hinged awnings provide shelter to an area below the one or more hinged awnings.

22. A mobile fitness plaza configured to be coupled to a frame mounted to a vehicle, wherein when coupled to the frame, the mobile fitness plaza comprising:
a plurality of alcove compartments supported on the frame, the plurality of alcove compartments configured to store exercise equipment disposed therein; and
one or more hinged awnings rotatably secured to a top portion of one or more of the plurality of alcove compartments,
wherein the one or more hinged awnings are selectively rotated between a stowed position in which the one or more hinged awnings provide an enclosure for one or more of the plurality of alcove compartments and a deployed position in which the one or more hinged awnings provide shelter to an area below the one or more hinged awnings,
wherein the one or more hinged awnings are selectively rotated between the stowed position and the deployed position responsive to a remote user input from a key fob associated with the vehicle.

23. A mobile fitness plaza configured to be coupled to a frame mounted to a vehicle, wherein when coupled to the frame, the mobile fitness plaza comprising:
a plurality of alcove compartments supported on the frame, the plurality of alcove compartments configured to store exercise equipment disposed therein;
a pivotable barbell station comprising:
a barbell sleeve configured to be pivotably mounted to a bumper of the vehicle and configured to receive an end of an exercise bar during use; and a latch configured to hold the barbell sleeve in an upright stowed position while the vehicle is in motion; and one or more hinged awnings rotatably secured to a top portion of one or more of the plurality of alcove compartments, wherein the one or more hinged awnings are selectively rotated between a stowed position in which the one or more hinged awnings provide an enclosure for one or more of the plurality of alcove compartments and a deployed position in which the one or more hinged awnings provide shelter to an area below the one or more hinged awnings.

24. A mobile fitness plaza configured to be coupled to a vehicle, wherein when coupled to the vehicle, the mobile fitness plaza comprising:

a plurality of alcove compartments supported by a frame associated with the vehicle, the plurality of alcove compartments configured to store exercise equipment disposed therein;

a rope mount disposed on either the frame or a bumper of the vehicle, the rope mount comprising a loop for receiving at least one exercise rope during use; and one or more hinged awnings rotatably secured to a top portion of one or more of the plurality of alcove compartments, wherein the one or more hinged awnings are selectively rotated between a stowed position in which the one or more hinged awnings provide an enclosure for one or more of the plurality of alcove compartments and a deployed position in which the one or more hinged awnings provide shelter to an area below the one or more hinged awnings.

* * * * *